US012030054B2

(12) United States Patent
Su et al.

(10) Patent No.: US 12,030,054 B2
(45) Date of Patent: Jul. 9, 2024

(54) MICROFLUIDIC APPARATUS, AND DRIVE CIRCUIT AND DRIVE METHOD THEREOF

(71) Applicant: Shanghai Tianma Micro-Electronics Co., Ltd., Shanghai (CN)

(72) Inventors: Ping Su, Shanghai (CN); Kerui Xi, Shanghai (CN); Baiquan Lin, Shanghai (CN); Huihui Jiang, Shanghai (CN); Yi Wang, Shanghai (CN); Aowen Li, Shanghai (CN); Xiao Chen, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 177 days.

(21) Appl. No.: 17/670,415

(22) Filed: Feb. 11, 2022

(65) Prior Publication Data

US 2023/0166258 A1 Jun. 1, 2023

(30) Foreign Application Priority Data

Nov. 30, 2021 (CN) ........................ 202111441457.2

(51) Int. Cl.
*B01L 3/00* (2006.01)

(52) U.S. Cl.
CPC ... *B01L 3/502792* (2013.01); *B01L 2300/123* (2013.01); *B01L 2400/0415* (2013.01)

(58) Field of Classification Search
CPC ... G09G 2300/0267; G09G 2320/0219; G09G 3210/0286; B01L 3/502792; B01L 2300/123; B01L 2400/0415
See application file for complete search history.

(56) References Cited

U.S. PATENT DOCUMENTS

2007/0252637 A1 11/2007 Zhou et al.

FOREIGN PATENT DOCUMENTS

| | | | |
|---|---|---|---|
| CN | 109584812 | A | 4/2019 |
| CN | 110189710 | A | 8/2019 |
| CN | 111146931 | A | 5/2020 |
| CN | 213186071 | U | 5/2021 |
| CN | 112892626 | A | 6/2021 |

*Primary Examiner* — Jill A Warden
*Assistant Examiner* — Michael Stanley Gzybowski
(74) *Attorney, Agent, or Firm* — Anova Law Group, PLLC

(57) ABSTRACT

A microfluidic apparatus, and its drive circuit and drive method are provided in the present disclosure. The drive circuit includes at least one switch unit, where the switch unit includes a first signal input terminal, a signal output terminal, first and second control signal terminals, a signal terminal, a first module, a second module, and a third module. The first module is electrically connected to the first signal input terminal, the signal output terminal and the second module; and the second module is electrically connected to the first control signal terminal. The first control signal terminal is configured to control the first module and the second module to be in conduction or disconnection, and the second control signal terminal is configured to control the third module to in conduction or disconnection, thereby controlling the signal output terminal to output a first or second signal.

18 Claims, 12 Drawing Sheets

10/111

MICROFLUIDIC APPARATUS, AND DRIVE CIRCUIT AND DRIVE METHOD THEREOF

CROSS-REFERENCE TO RELATED APPLICATION

This application claims the priority of Chinese Patent Application No. 202111441457.2, filed on Nov. 30, 2021, the content of which is incorporated herein by reference in its entirety.

TECHNICAL FIELD

The present disclosure generally relates to the field of microfluidic technology and, more particularly, relates to a microfluidic apparatus, and its drive circuit and drive method.

BACKGROUND

Microfluidic technology is an emerging interdisciplinary subject involving chemistry, fluid physics, microelectronics, new materials, biology, and biomedical engineering; and can precisely control the movement of liquid droplets, realize operations including the fusion and separation of liquid droplets, and complete various biochemical reactions. The main feature of the microfluidic technology is fluid manipulation in the micron-scale space. Recently, the microfluidic chip is widely used in biology, chemistry, medicine, and other fields because of its advantages including small size, low power consumption, low cost, small amount required of samples and reagents, individual and precise control of liquid droplets, short detection time, high sensitivity, and easy integration with other devices.

The microfluidic apparatus in the existing technology normally includes a control circuit and a drive electrode. The control circuit is configured to provide a voltage to the drive electrode. Therefore, an electric field may be formed between adjacent drive electrodes, and the liquid droplets may move under the driving action of the electric field.

In the existing technology, the drive voltage that an active drive chip can output is significantly different from the voltage that can drive the movement of the liquid droplets. Normally, the voltage that can drive the movement of the liquid droplets needs to be higher than 40V, which extremely exceeds the liquid crystal drive voltage of the display screen. Therefore, the drive chip of the display screen may not be used to drive the microfluidic thin-film transistor (TFT) array. As such, the existing active drive chip may have the problem of insufficient drive voltage.

Therefore, there is a need to develop a microfluidic apparatus to realize the detection and reaction of large quantities of samples.

SUMMARY

One aspect of the present disclosure provides a drive circuit of a microfluidic apparatus. The drive circuit includes at least one switch unit, where a switch unit of the at least one switch unit includes a first signal input terminal, a signal output terminal, a first control signal terminal, a second control signal terminal, a signal terminal, a first module, a second module, and a third module. The first module is electrically connected to the first signal input terminal, the signal output terminal and the second module; the second module is at least electrically connected to the first control signal terminal; and the third module is at least electrically connected to the signal output terminal, the second control signal terminal and the signal terminal; and the first control signal terminal is configured to control the first module and the second module to be in conduction or disconnection, and the second control signal terminal is configured to control the third module to in conduction or disconnection, thereby controlling the signal output terminal to output a first signal of the first signal input terminal or a second signal of the signal terminal.

Another aspect of the present disclosure provides a microfluidic apparatus. The apparatus includes a first substrate and a second substrate which are disposed oppositely; a drive electrode layer which is on the first substrate and includes a plurality of drive electrodes; a first insulating layer on a side of the drive electrode layer facing the second substrate; a second insulating layer which is on the second substrate and adjacent to a side of the first insulating layer; and a passage, formed between the first insulating layer and the second insulating layer and used to accommodate liquid droplets. A drive electrode of the plurality of drive electrodes is electrically connected to a drive circuit, where the drive circuit includes at least one switch unit. A switch unit of the at least one switch unit includes a first signal input terminal, a signal output terminal, a first control signal terminal, a second control signal terminal, a signal terminal, a first module, a second module, and a third module. The first module is electrically connected to the first signal input terminal, the signal output terminal, and the second module; the second module is at least electrically connected to the first control signal terminal; and the third module is at least electrically connected to the signal output terminal, the second control signal terminal, and the signal terminal. The first control signal terminal is configured to control the first module and the second module to be in conduction or disconnection, and the second control signal terminal is configured to control the third module to in conduction or disconnection, thereby controlling the signal output terminal to output a first signal of the first signal input terminal or a second signal of the signal terminal.

Another aspect of the present disclosure provides a drive method of a microfluidic apparatus, configured for the microfluidic apparatus. The microfluidic apparatus includes a first substrate and a second substrate which are disposed oppositely; a drive electrode layer which is on the first substrate and includes a plurality of drive electrodes; a first insulating layer on a side of the drive electrode layer facing the second substrate; a second insulating layer which is on the second substrate and adjacent to a side of the first insulating layer; and a passage, formed between the first insulating layer and the second insulating layer and used to accommodate liquid droplets, where a drive electrode of the plurality of drive electrodes is electrically connected to a drive circuit; the drive circuit includes at least one switch unit; a switch unit of the at least one switch unit includes a signal output terminal, a first signal input terminal, and a signal terminal; the signal output terminal outputs a first signal of the first signal input terminal or a second signal of the signal terminal. The drive method includes a first drive stage and a second drive stage, where in the first drive stage, the signal output terminal transmits the first signal to the connector, and the drive electrode receives the first signal; and in the second drive stage, the signal output terminal transmits the second signal to the connector, and the drive electrode receives the second signal.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate embodiments of the present disclosure, and together with the description are used to explain the principle of the present disclosure.

DETAILED DESCRIPTION

Figure 1:
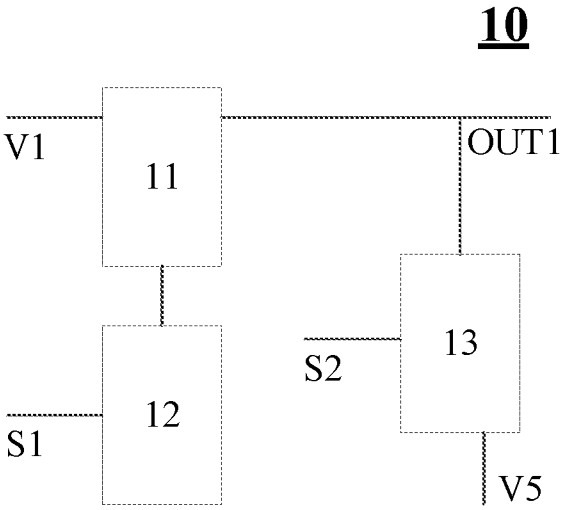
FIG. 1 illustrates a schematic of an exemplary switch unit in a drive circuit according to various embodiments of the present disclosure.

Various exemplary embodiments of the present disclosure are be described in detail with reference to the accompanying drawings. It should be noted that unless specifically stated otherwise, the relative arrangement of components and steps, numerical expressions and numerical values described in these embodiments may not limit the scope of the present disclosure.

The following description of at least one exemplary embodiment may be merely illustrative and may not be used to limit the present disclosure and its application or use.

The technologies, methods, and equipment known to those skilled in the art may not be discussed in detail, but where appropriate, the technologies, methods, and equipment should be regarded as a part of the present disclosure.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings. Therefore, once an item is defined in one drawing, it does not need to be further discussed in the subsequent drawings.

In the existing technology, the drive voltage that an active drive chip can output is significantly different from the voltage that can drive the movement of the liquid droplets. Normally, the voltage that can drive the movement of the liquid droplets needs to be higher than 40V, which far exceeds the liquid crystal drive voltage of the display screen. Therefore, the display drive chip of the display screen may not be used to drive the microfluidic TFT array, so that the existing active drive chip may have the problem of insufficient drive voltage.

The present disclosure provides a microfluidic apparatus and its drive circuit and drive method. Devices such as metal-oxide-semiconductor (MOS) transistors, resistors, and the like in the drive circuit may be used to build a new type of drive units, and the field-programmable gate array (FPGA) output signal may be used to control each drive unit to output signals according to any time sequence. By selecting suitable devices, the high level of the output signal of the new drive unit can reach 200V or more, such that it may solve the problem that the microfluidic apparatus is insufficient to provide the voltage required to drive and move the liquid droplets.

FIG. 1 illustrates a schematic of an exemplary switch unit in a drive circuit according to various embodiments of the present disclosure. Referring to FIG. 1, the present disclosure provides a drive circuit of a microfluidic apparatus, which may include at least one switch unit 10. The switch unit 10 may include the first signal input terminal V1, a signal output terminal OUT1, the first control signal terminal S1, the second control signal terminal S2, and a signal terminal V5, the first module 11, the second module 12, and the third module 13.

The first module 11 may be electrically connected to the first signal input terminal V1, the signal output terminal OUT1, and the second module 12; the second module 12 may be at least electrically connected to the first control signal terminal S1; and the third module 13 may be at least electrically connected to the signal output terminal OUT1, the second control signal terminal S2, and the signal terminal V5.

The first control signal terminal S1 may be configured to control the first module 11 and the second module 12 to be in conduction or disconnection, and the second control signal terminal S2 may be configured to control the third module 13 to in conduction or disconnection, such that the signal output terminal OUT1 may be controlled to output the first signal of the first signal input terminal V1 or the second signal of the signal terminal V5.

For example, the present disclosure provides the drive circuit for the microfluidic apparatus. The drive circuit may include at least one switch unit 10; and the switch unit 10 may include the first module 11, the second module 12, and the third module 13. The first module 11 may be electrically connected to the first signal input terminal V1, the signal output terminal OUT1, and the second module 12. The first signal input terminal V1 may, for example, be configured to input a high-level signal to the first module 11; and when the first module 11 is in conduction, the high-level signal may be transmitted to the drive electrode through the signal output terminal OUT1. The second module 12 may at least be electrically connected to the first control signal terminal S1 and the first module 11. The types of the electrical signals inputted from the first control signal terminal S1 may be configured to control the first module 11 and the second module 12 to be in a conduction or disconnection state, thereby controlling whether the electrical signals inputted from the first signal input terminal V1 can be transmitted to the drive electrode. The third module 13 may at least be electrically connected to the signal output terminal OUT1, the second control signal terminal S2, and the signal terminal V5. The types of the electrical signals inputted from the second control signal terminal S2 may be configured to control the third module 13 to be in a conduction or disconnection state, thereby controlling whether the electrical signals inputted from the signal terminal V5 can be transmitted to the drive electrode through the signal output terminal OUT1.

The control of whether the first module 11 and the second module 12 are in the conduction state may be realized by configuring the first module 11, the second module 12, and the third module 13 in the switch unit 10 and by configuring different electrical signal types transmitted to the second module 12 through the first control signal terminal S1. The control of whether the third module 13 is in the conduction state may be realized by different electrical signal types transmitted to the third module 13 by the second control signal terminal S2, thereby controlling the signal output terminal OUT1 to output the first signal inputted from the first signal input terminal V1 or the second signal inputted from the signal terminal V5. For example, when the first control signal terminal S1 controls the first module 11 and the second module 12 to be in the conduction state, the first signal inputted from the first signal input terminal V1 may be transmitted to the signal output terminal OUT1 for outputting; and when the second control signal terminal S2 controls the third module 13 to be in the conduction state, the second signal inputted from the signal terminal V5 may be transmitted to the signal output terminal OUT1 for outputting.

It should be noted that the electrical signal outputted by the drive circuit provided in the present disclosure may be transmitted to at least a part of the drive electrodes electrically connected to the microfluidic apparatus, which may be configured to generate the electric field to drive the movement of the liquid droplets in the microfluidic apparatus. The drive circuit of the microfluidic apparatus provided in the present disclosure may include at least one switch unit 10. The present disclosure may update and adjust the components/devices included in the switch unit 10 and regulate that the voltage signal received by the first signal input terminal V1 of the switch unit 10 is not lower than 40V. Therefore, the voltage of the first signal transmitted to and outputted from the signal output terminal OUT1 may be sufficiently large; and when the first signal is finally transmitted to the corresponding drive electrode, the drive voltage received by the drive electrode may be sufficient to drive the liquid droplets in a corresponding position to be moved, mixed or separated.

It should be noted that the first signal and the second signal herein are respectively transmitted to two adjacent drive electrodes in the microfluidic apparatus simultaneously; and the drive signals of different magnitudes may form the electric field between adjacent drive electrodes, so that the liquid droplets may move under the driving of different electric fields generated by the drive electrodes, which may be beneficial for enabling a corresponding microfluidic apparatus to detect or react to a large number of samples.

Figure 2:
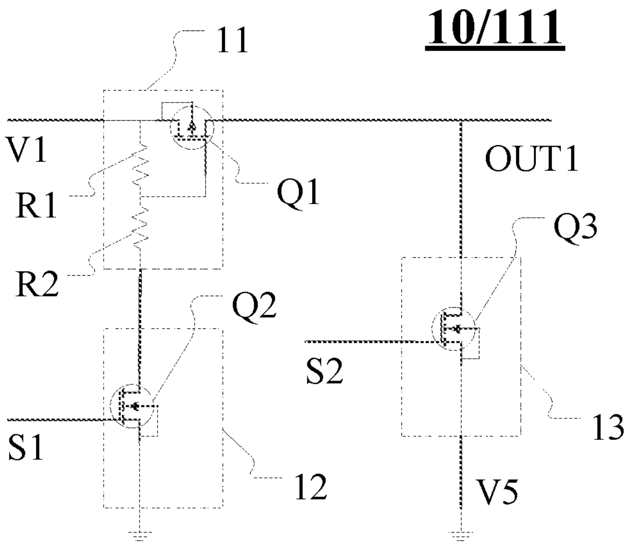
FIG. 2 illustrates another schematic of an exemplary switch unit in a drive circuit according to various embodiments of the present disclosure.

FIG. 2 illustrates another schematic of an exemplary switch unit in a drive circuit according to various embodiments of the present disclosure. Referring to FIGS. 1-2, optionally, the first module 11 may include the first transistor Q1, the first resistor R1, and the second resistor R2.

The first terminal of the first resistor R1 may be electrically connected to the first signal input terminal V1 and the first electrode of the first transistor Q1, and the second terminal of the first resistor R1 may be electrically connected to the first terminal of the second resistor R2 and the control electrode of the first transistor Q1.

The second terminal of the second resistor R2 may be electrically connected to the second module 12.

The second electrode of the first transistor Q1 may be electrically connected to the signal output terminal OUT1.

For example, the switch unit 10 provided by the present disclosure may be rebuilt by using MOS transistors (metal-oxide-semiconductor field-effect transistor), resistors and other components/devices that have used in the existing technology. Herein, the present disclosure provides an optional configuration manner of the first module 11 including the first transistor Q1, the first resistor R1, and the second resistor R2.

The first terminal of the first resistor R1 may be electrically connected to the first signal input terminal V1 and the first electrode of the first transistor Q1; and the second terminal of the first resistor R1 may be electrically connected to the first terminal of the second resistor R2 and the control electrode of the first transistor Q1. The first resistor R1 and the second resistor R2 may be used to divide current and voltage in the circuit to ensure the normal operation of the circuit in the first module 11.

In addition, the second electrode of the first transistor Q1 in the first module 11 may be electrically connected to the signal output terminal OUT1. When the electrical signal received by the control electrode of the first transistor Q1 controls the first transistor Q1 to be in the conduction state, the first electrode of the first transistor Q1 may receive the voltage signal from the first signal input terminal V1 and transmit the signal to the signal output terminal OUT1 of the first switch unit 10/111 through the second electrode of the first transistor Q1. When the electrical signal received by the control electrode of the first transistor Q1 controls the first transistor Q1 to be in the disconnection state, the voltage signal inputted from the first signal input terminal V1 may not be transmitted to the signal output terminal OUT1 of the first switch unit 10/111. Therefore, whether the input signal of the first signal input terminal V1 can be transmitted to the signal output terminal OUT1 may be realized through whether the first module 11 is in the conduction state.

The first resistor R1 and the second resistor R2 provided in the first module 11 may form a voltage divider circuit. A voltage difference may be between the control electrode and the first electrode of the first transistor Q1 (two terminals of the first resistor R1), which is configured to drive the first transistor Q1 to be in conduction and prevent the MOS transistor (the first transistor Q1) from being damaged due to excessive voltage, which may protect the first transistor Q1 and be beneficial for protecting the normal operation of subsequent circuits.

It should be noted that the first resistor R1 and the second resistor R2 configured in the first module 11 may be common resistors, which may not be limited in detail in the present disclosure; and users may also adjust the resistance type according to their own needs.

Referring to FIGS. 1 and 2, optionally, the second module 12 may include the second transistor Q2.

The first electrode of the second transistor Q2 may be electrically connected to the first module 11, the control electrode of the second transistor Q2 may be electrically connected to the first control signal terminal S1, and the second electrode of the second transistor Q2 may be electrically grounded.

For example, the switch unit 10 provided in the present disclosure may be rebuilt by using existing components/devices such as MOS transistors and resistors. Herein, the present disclosure may provide an optional configuration manner for the second module 12 as follows. The second module 12 may include only one second transistor Q2, the first electrode of the second transistor Q2 may be electrically connected to the second terminal of the second resistor R2 in the first module 11 at this point, the control electrode of the second transistor Q2 may be electrically connected to the first control signal terminal S1, and the second electrode of the second transistor Q2 may be grounded.

The type of the electrical signal transmitted through the first control signal terminal S1 may control whether the second transistor Q2 is in the conduction state, thereby controlling whether the electrical signal at the ground terminal can be transmitted to the control electrode of the first transistor Q1 through the second transistor Q2 and further realizing the control of whether the first transistor Q1 is in the conduction state. When the first transistor Q1 is in the conduction state, the signal output terminal OUT1 may output the first signal inputted by the first signal input terminal V1.

The signal type of the first signal received by the first signal input terminal V1 may be a square wave signal that periodically changes according to a certain time interval; and the signal type received by the first control signal terminal S1 may also be a square wave signal that changes periodically according to a certain time interval. It should be noted that when the first transistor Q1 and the second transistor Q2 are not in the conduction state, the signal type received by the first signal input terminal V1 and the first control signal terminal S1 may be configured as a DC signal at this point.

Referring to FIGS. 1 and 2, optionally, the third module 13 may include the third transistor Q3.

The first electrode of the third transistor Q3 may be electrically connected to the signal output terminal OUT1, the second electrode of the third transistor Q3 may be electrically connected to the signal terminal V5, and the control electrode of the third transistor Q3 may be electrically connected to the second control signal terminal S2.

For example, the switch unit 10 provided in the present disclosure may be rebuilt by using existing components/devices such as MOS transistors and resistors. Herein, the present application may provide an optional configuration manner for the third module 13 as follows. The third module 13 may only include the third transistor Q3, the first electrode of the third transistor Q3 may be electrically connected to the signal output terminal OUT1 at this point; the second electrode of the third transistor Q3 may be electrically connected to the signal terminal V5, and the control electrode of the third transistor Q3 may be electrically connected to the second control signal terminal S2.

The type of the electrical signal transmitted through the second control signal terminal S2 may control whether the third transistor Q3 is in the conduction state, thereby controlling whether the electrical signal of the signal terminal V5 can be transmitted to the signal output terminal OUT1 through the third transistor Q3. When the third transistor Q3 is in the conduction state, the signal output terminal OUT1 may output the second signal inputted from the signal terminal V5.

The signal type received by the second control signal terminal S2 may also be a square wave signal that changes periodically according to a certain time interval. It should be noted that when the third transistor Q3 is not in the conduction state, the signal type received by the second control signal terminal S2 can be configured as a DC signal at this point.

Figure 3:
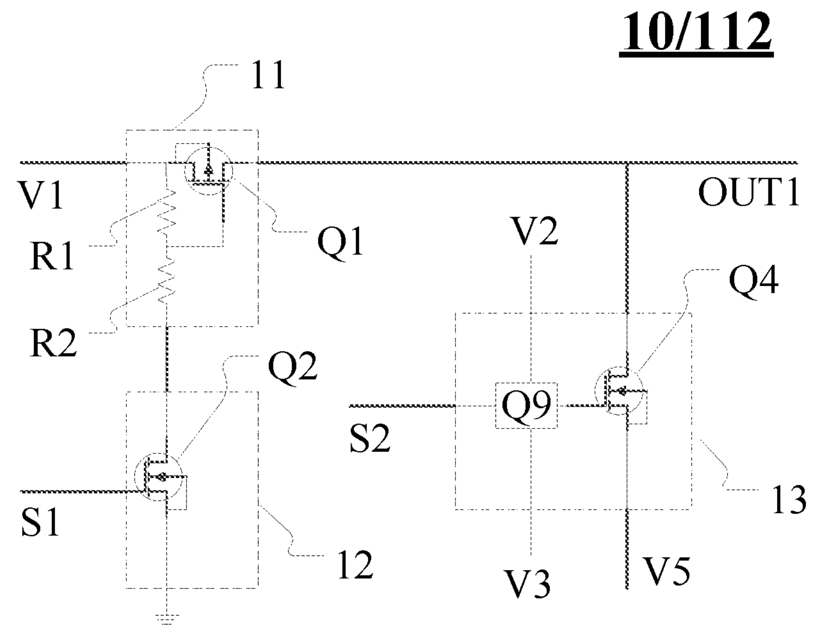
FIG. 3 illustrates another schematic of an exemplary switch unit in a drive circuit according to various embodiments of the present disclosure.

FIG. 3 illustrates another schematic of an exemplary switch unit in a drive circuit according to various embodiments of the present disclosure. Referring FIGS. 1 and 3, optionally, the third module 13 may include the fourth transistor Q4, a single-pole double-throw switch Q9, the second signal input terminal V2, and the third signal input terminal V3.

The first electrode of the fourth transistor Q4 may be electrically connected to the signal output terminal OUT1, the second electrode of the fourth transistor Q4 may be electrically connected to the signal terminal V5, and the control electrode of the fourth transistor Q4 may be electrically connected to the first terminal of the single-pole double-throw switch Q9.

The second terminal of the single-pole double-throw switch Q9 may be electrically connected to the second control signal terminal S2, the third terminal of the single-pole double-throw switch Q9 may be electrically connected to the second signal input terminal V2, and the fourth terminal of the single-pole double-throw switch Q9 may be electrically connected to the third signal input terminal V3.

For example, the present disclosure also provides another optional configuration manner for the third module 13 as follows. The third module 13 may include one single-pole double-throw switch Q9 and one fourth transistor Q4, where the first electrode of the fourth transistor Q4 may be electrically connected to the signal output terminal OUT1, the second electrode of the fourth transistor Q4 may be electrically connected to the signal terminal V5, and the control electrode of the fourth transistor Q4 may be electrically connected to the first terminal of the single-pole double-throw switch Q9.

For the single-pole double-throw switch Q9, the first terminal may be electrically connected to the control electrode of the fourth transistor Q4, the second terminal may be electrically connected to the second control signal terminal S2, the third terminal may be electrically connected to the second signal input terminal V2, and the fourth terminal may be electrically connected to the third signal input terminal V3. The electrical signal inputted from the second signal input terminal V2 or the electrical signal inputted from the third signal input terminal V3 may be combined with the electrical signal transmitted from the second control signal terminal S2 to control the type of the electrical signal transmitted to the control electrode of the fourth transistor Q4. By receiving the electrical signal type which is transmitted to the control electrode of the fourth transistor Q4 from the single-pole double-throw switch Q9, the control of whether the fourth transistor Q4 is in conduction may be realized. Therefore, it may control whether the electric signal received by the signal terminal V5 can be transmitted to the signal output terminal OUT1 through the fourth transistor Q4. When the fourth transistor Q4 is in the conduction state, the signal output terminal OUT1 may output the second signal inputted from the signal terminal V5.

The signal types received by the second signal input terminal V2 and the third signal input terminal V3 may also be square wave signals that periodically change according to a certain time interval.

Figure 4:
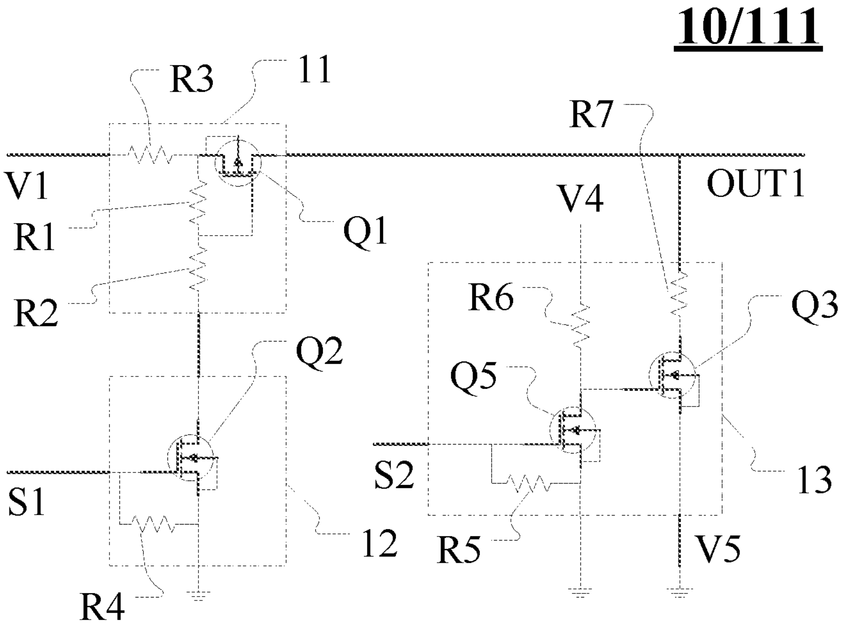
FIG. 4 illustrates another schematic of an exemplary switch unit in a drive circuit according to various embodiments of the present disclosure.
Figure 5:
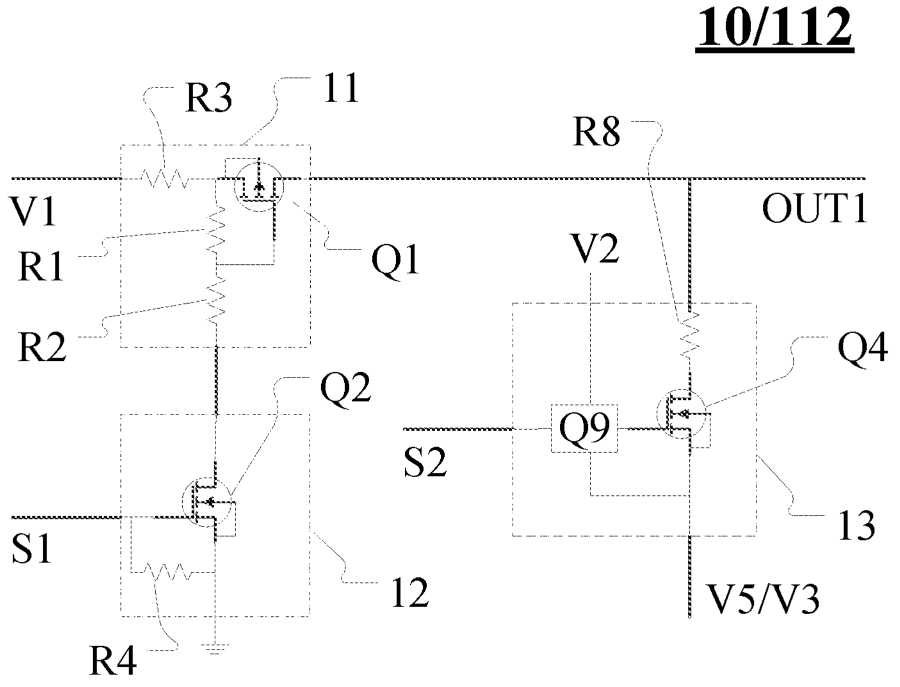
FIG. 5 illustrates another schematic of an exemplary switch unit in a drive circuit according to various embodiments of the present disclosure.

FIG. 4 illustrates another schematic of an exemplary switch unit in a drive circuit according to various embodiments of the present disclosure; and FIG. 5 illustrates another schematic of an exemplary switch unit in a drive circuit according to various embodiments of the present disclosure. Referring to FIGS. 1, 4, and 5, optionally, the first module 11 may further include the third resistor R3.

The first terminal of the third resistor R3 may be electrically connected to the first signal input terminal V1, and the second terminal of the third resistor R3 may be electrically connected to the first terminal of the second resistor R2.

For example, the present disclosure also provides an optional embodiment of the first module 11 as follows. Based on the first module 11 including the first transistor Q1, the first resistor R1, and the second resistor R2, the first module may be configured to further include the third resistor R3.

The newly added third resistor R3 may be added between the first terminal of the second resistor R2 and the first signal input terminal V1. For example, the first terminal of the third resistor R3 may be electrically connected to the first signal input terminal V1, and the second terminal of the third resistor R3 may be electrically connected to the first terminal of the second resistor R2. The third resistor R3 added herein may be configured to limit the current of the electrical signal inputted from the first signal input terminal V1, thereby protecting the circuit during operation.

Referring to FIGS. 1 and 5, optionally, the second module 12 may further include the fourth resistor R4.

The first terminal of the fourth resistor R4 may be electrically connected to the first control signal terminal S1, and the second terminal of the fourth resistor R4 may be electrically connected to the second electrode of the second transistor Q2.

For example, the present disclosure also provides an optional embodiment of the second module 12, that is, based on the second module 12 including the second transistor Q2, the fourth resistor R4 may be further added.

The added fourth resistor R4 may be, for example, configured as that the first terminal of the fourth resistor R4 may be electrically connected to the first control signal terminal S1. That is, the first terminal of the fourth resistor R4 may be electrically connected to the control electrode of the second transistor Q2, and the second terminal of the fourth resistor R4 may be electrically connected to the second electrode of the second transistor Q2. The fourth resistor R4 added herein may be configured to divide the electrical signals inputted from the first control signal terminal S1, thereby protecting the circuit during operation.

Referring to FIGS. 1 and 4, optionally, the third module 13 may include the third transistor Q3, the fifth transistor Q5, the fifth resistor R5, the sixth resistor R6, the seventh resistor R7, and the fourth signal input terminal V4.

The first terminal of the fifth resistor R5 may be electrically connected to the second control signal terminal S2 and the control electrode of the fifth transistor Q5; and the second terminal of the fifth resistor R5 may be electrically connected to the first electrode of the fifth transistor Q5 and may also be grounded.

The first terminal of the sixth resistor R6 may be electrically connected to the fourth signal input terminal V4, and the second terminal of the sixth resistor R6 may be electrically connected to the second electrode of the fifth transistor Q5 and be electrically connected to the control electrode of the third transistor Q3.

The first terminal of the seventh resistor R7 may be electrically connected to the first electrode of the third transistor Q3, and the second terminal of the seventh resistor R7 may be electrically connected to the signal output terminal OUT1.

The second electrode of the third transistor Q3 may be electrically connected to the signal terminal V5.

For example, the present disclosure herein also provides another optional configuration manner for the third module 13 as follows. The third module 13 may be configured with the fifth resistor R5 and the fifth transistor Q5; the first terminal of the fifth resistor R5 may be electrically connected to the second control signal terminal S2; and the second terminal of the fifth resistor R5 may be electrically connected to the first terminal of the fifth transistor Q5, which may be configured to divide the electricals signal inputted from the second control signal terminal S2, thereby protecting the circuit during operation.

The third module 13 may also be configured with the sixth resistor R6, the third transistor Q3, and the fourth signal input terminal V4. The first terminal of the sixth resistor R6 may be electrically connected to the fourth signal input terminal V4, and the second terminal of the sixth resistor R6 may be electrically connected to the second electrode of the fifth transistor Q5, that is, to the control electrode of the third transistor Q3. The sixth resistor R6 herein may be configured to control the current transmitted from the fourth signal input terminal V4 to the third transistor Q3 not to exceed the prescribed value required for actual operation, thereby ensuring the normal circuit operation. The second electrode of the third transistor Q3 may be electrically connected to the signal terminal V5. For example, the signal terminal V5 herein may be configured to be grounded to ensure ground potential balance.

The seventh resistor R7 may also be configured in the third module 13. The seventh resistor R7 may be configured between the first electrode of the third transistor Q3 and the signal output terminal OUT1, which is configured to control the magnitude of the signal transmitted to the signal output terminal OUT1. Therefore, the magnitude of the electrical signal transmitted by the drive circuit to the device to be driven may be controlled within the range of actual operation requirements, such that it may ensure that the components/devices to be driven by the drive circuit are normally driven and may avoid problems such as damage to the components/devices by excessive current/voltage.

The signal type received by the fourth signal input terminal V4 may also be a square wave signal that changes periodically according to a certain time interval.

Referring to FIGS. 1 and 5, optionally, the third module 13 may further include the eighth resistor R8.

The first terminal of the eighth resistor R8 may be electrically connected to the signal output terminal OUT1, and the second terminal of the eighth resistor R8 may be electrically connected to the first electrode of the fourth transistor Q4.

The third signal input terminal V3 and the signal terminal V5 may receive a same signal.

For example, the present disclosure also provides a configuration manner of the third module 13. When the third module 13 includes the single-pole double-throw switch Q9, the fourth terminal of the single-pole double-throw switch Q9 may be electrically connected to the second terminal of the fourth transistor Q4, that is, the third signal input terminal V3 and the signal terminal V5 in the third module 13 may be configured to receive the drive by a same electric signal. In addition, the eighth resistor R8 may also be configured in the third module 13. The eighth resistor R8 may be between the fourth transistor Q4 and the signal output terminal OUT1, which is configured to control the magnitude of the signal transmitted to the signal output terminal OUT1. Therefore, the magnitude of the electrical signal transmitted by the drive circuit to the device to be driven may be controlled within the range of actual operation requirements, such that it may ensure that the components/devices to be driven by the drive circuit are normally driven and may avoid problems such as damage to the components/devices by excessive current/voltage.

Based on the above-mentioned configuration method of the third module 13, the present disclosure also provides an optional configuration method of the third module 13 that the signal terminal V5 in the third module 13 may be configured to receive a step-down signal, which is used to realize the transmission of the step-down signal required by the signal output terminal OUT1 through the fourth transistor Q4.

The signal type received by the third signal input terminal V3/the signal terminal V5 may also be a square wave signal that changes periodically according to a certain time interval.

Referring to FIGS. 1 and 4, optionally, the voltage signal received by the fourth signal input terminal V4 may be V4, where 10V≤V4≤14V.

For example, when the third module 13 in the drive circuit switch unit 10 includes the fourth signal input terminal V4, the present disclosure provides a voltage signal received by the fourth signal input terminal V4 which may have a selectable value range of 10V-14V. Therefore, it may ensure that the voltage signal transmitted to the control electrode of the third transistor Q3 may have a sufficient voltage difference with the second electrode of the third transistor Q3, thereby ensuring the conduction of the third transistor Q3. In such way, the voltage signal on one terminal side of the second electrode of the third transistor Q3 may be transmitted to the signal output terminal OUT1.

Figure 6:
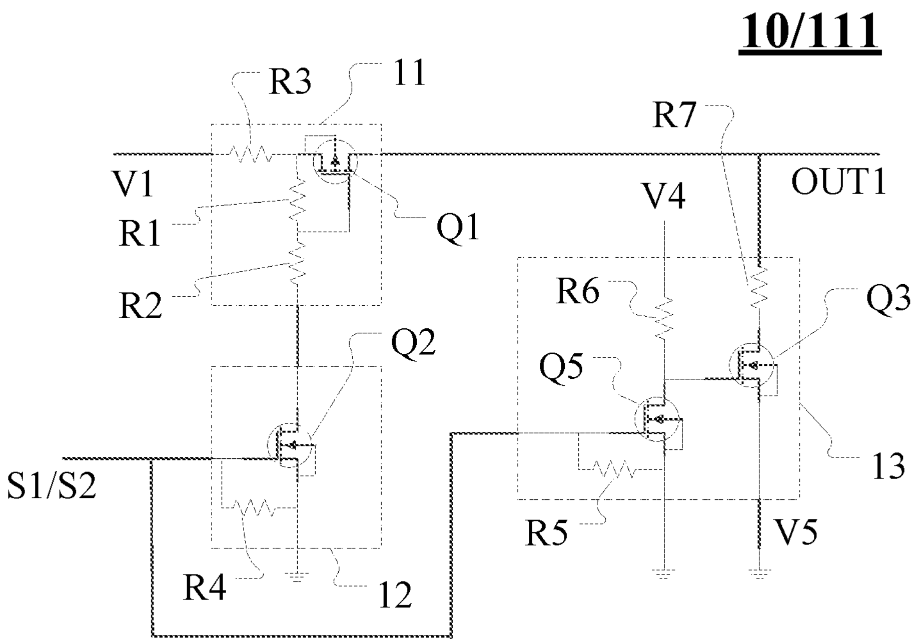
FIG. 6 illustrates another schematic of an exemplary switch unit in a drive circuit according to various embodiments of the present disclosure.
Figure 7:
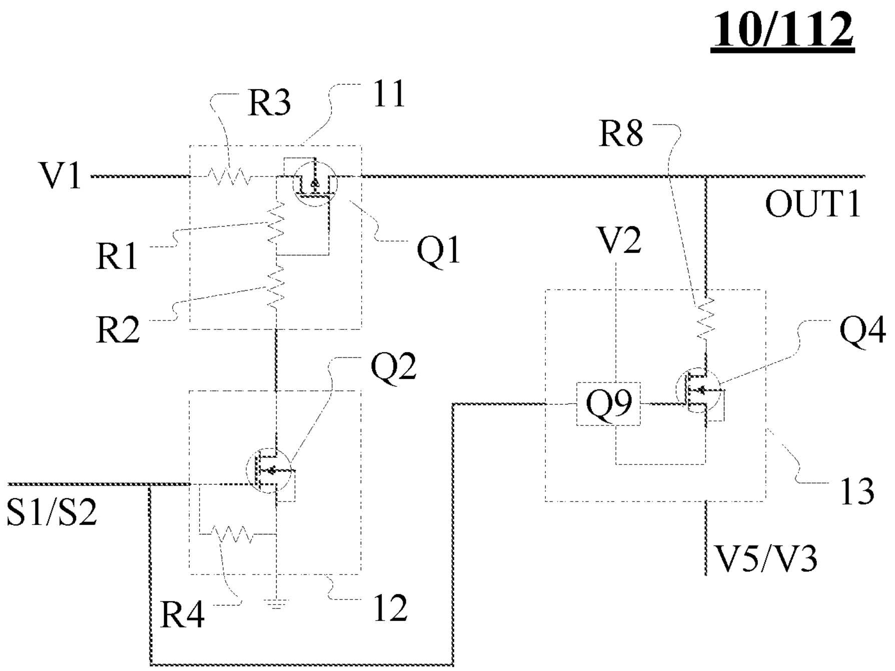
FIG. 7 illustrates another schematic of an exemplary switch unit in a drive circuit according to various embodiments of the present disclosure.

FIG. 6 illustrates another schematic of an exemplary switch unit in a drive circuit according to various embodiments of the present disclosure; and FIG. 7 illustrates another schematic of an exemplary switch unit in a drive circuit according to various embodiments of the present disclosure. Referring to FIGS. 1, 6 and 7, optionally, the first control signal terminal S1 and the second control signal terminal S2 may be electrically connected with each other.

For example, an optional embodiment of the drive circuit 100 provided in the present disclosure may be that the first control signal terminal S1 and the second control signal terminal S2 in the drive circuit switch unit 10 may be configured to receive a same electrical signal simultaneously. In the configuration of the switch unit 10, the first control signal terminal S1 and the second control signal terminal S2 may be electrically connected with each other, such that the first control signal terminal S1 and the second control signal terminal S2 may simultaneously receive a same electrical signal. Such configuration may simplify the circuit structure of the drive circuit 100 based on the normal operation of the drive circuit 100. Obviously, the structure shown in FIG. 4 and FIG. 5 may also be used as long as the electrical signals transmitted to the first control signal terminal S1 and the second control signal terminal S2 are same.

It should be noted that in the drive circuits shown in FIG. 2 to FIG. 8 provided by embodiments of the present disclosure, the first transistors Q1 may all be P-type MOS transistors (e.g., P-channel enhancement mode metal-oxide-semiconductor field effect transistors (MOSFET)), and other transistors may all be N-type MOS transistors (e.g., N-channel enhancement mode MOSFETs), which may, obviously, only be an optional embodiment provided by the present disclosure, and users may adjust the selection of transistors according to actual design requirements.

Figure 8:
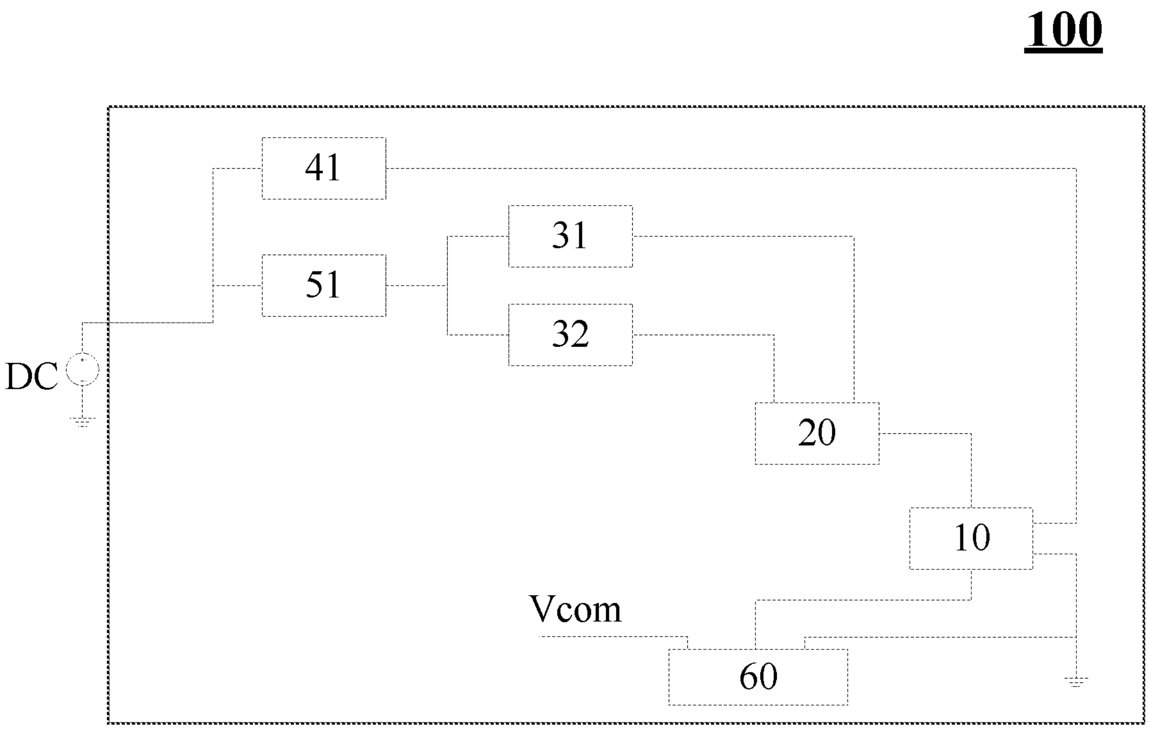
FIG. 8 illustrates a schematic of an exemplary drive circuit according to various embodiments of the present disclosure.
Figure 9:
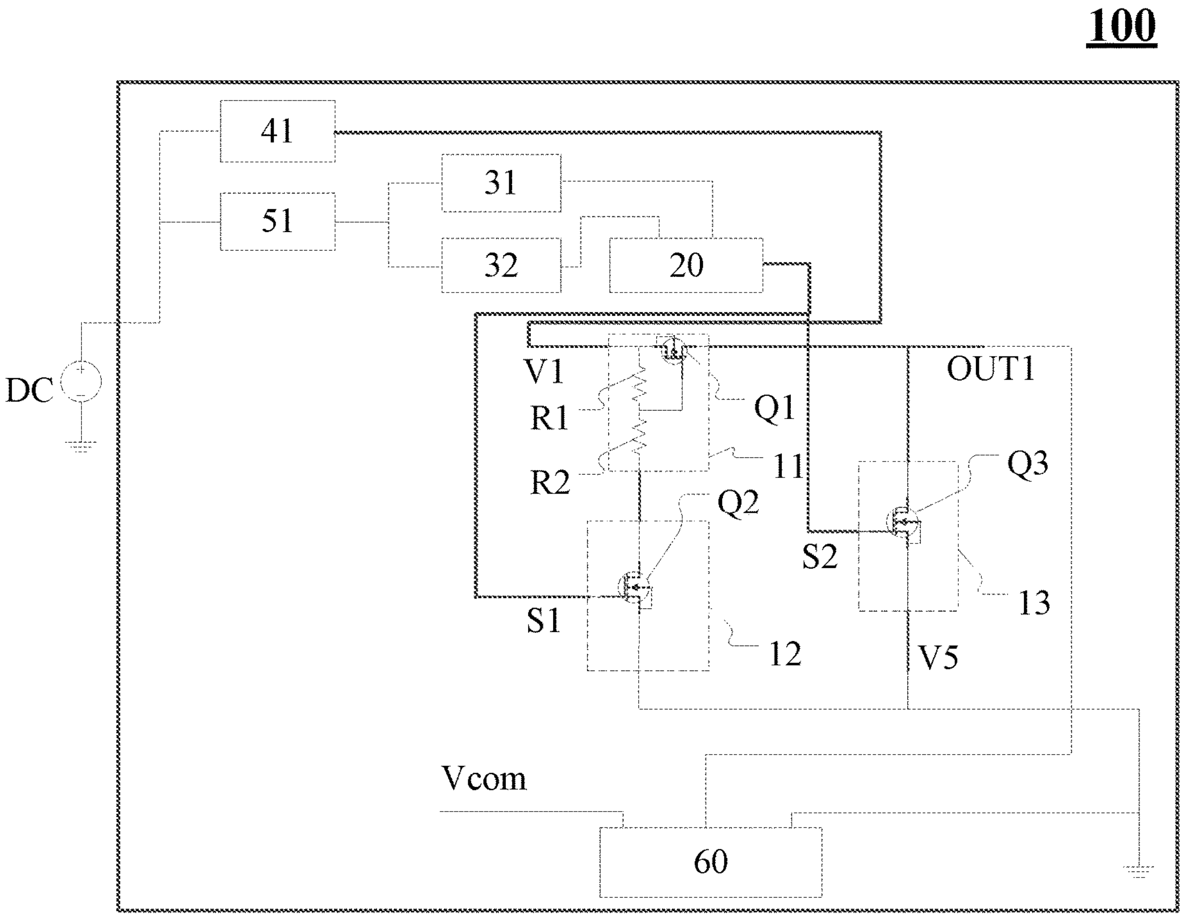
FIG. 9 illustrates another schematic of an exemplary drive circuit according to various embodiments of the present disclosure.
Figure 10:
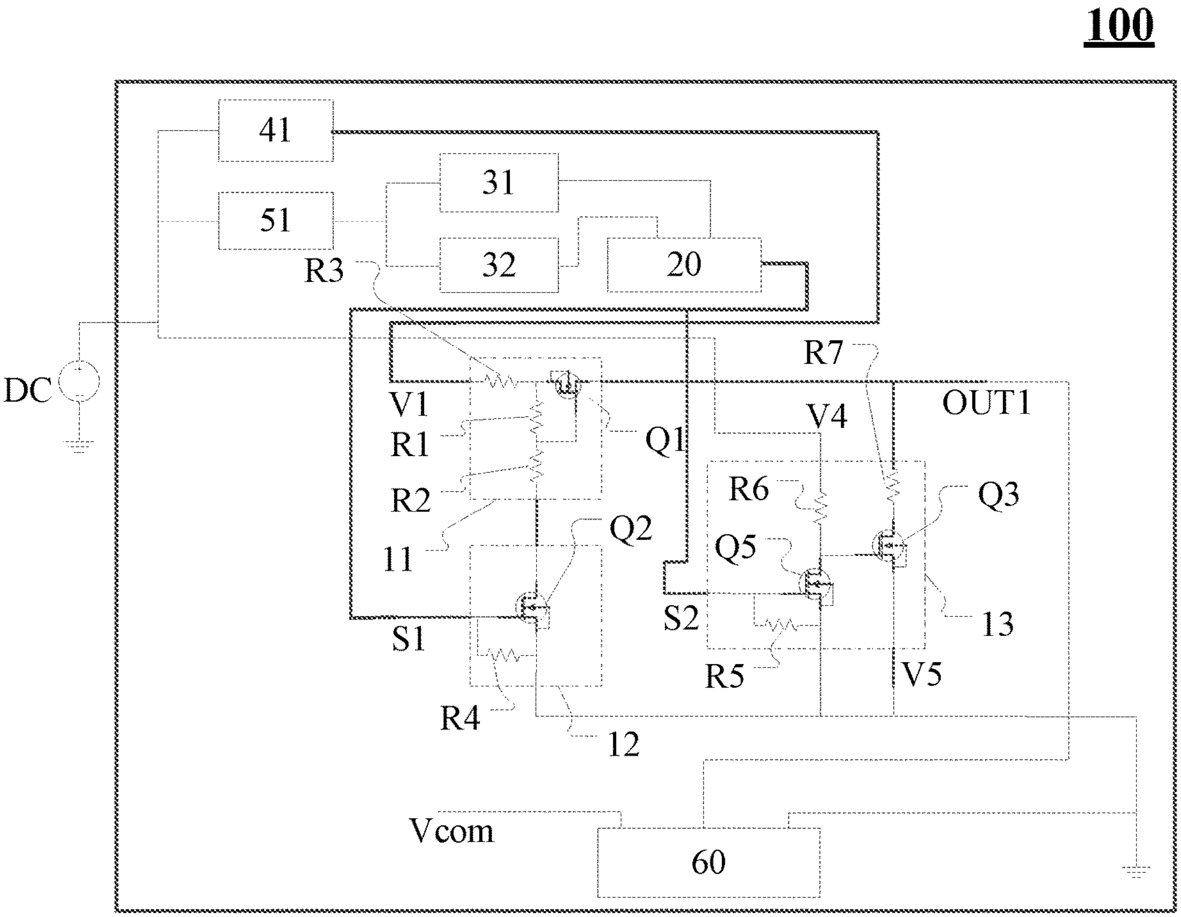
FIG. 10 illustrates another schematic of an exemplary drive circuit according to various embodiments of the present disclosure.

FIG. 8 illustrates a schematic of an exemplary drive circuit according to various embodiments of the present disclosure; FIG. 9 illustrates another schematic of an exemplary drive circuit according to various embodiments of the present disclosure; and FIG. 10 illustrates another schematic of an exemplary drive circuit according to various embodiments of the present disclosure. Referring to FIGS. 8-10, optionally, the drive circuit 100 may further include an integrated chip 20 which may be electrically connected to the first control signal terminal S1 and the second control signal terminal S2 of any switch unit 10.

For example, in addition to above-mentioned various switch units 10 provided, the drive circuit 100 may also be configured with the integrated chip 20. The integrated chip 20 herein may be configured as an FPGA (field programmable gate array) chip. In the drive circuit 100, one terminal of the integrated chip 20 may be at least electrically connected to the first control signal terminal S1 and the second control signal terminal S2 of one switch unit 10. The FPGA chip may be configured to generate electrical signals to be transmitted to the first control signal terminal S1 and the second control signal terminal S2 of each switch unit 10 that are electrically connected with each other according to a certain time sequence. Therefore, each switch unit 10 that are electrically connected with each other may be controlled to generate a corresponding high-voltage control signal, thereby performing the adjustments required for the corresponding operations on the components/devices that the drive circuit 100 needs to drive.

Referring to FIGS. 8-10, optionally, the drive circuit 100 may further include the first step-up unit 41, the first step-down unit 51, the first voltage stabilizer 31, the second voltage stabilizer 32, a total voltage signal terminal DC, and a connector 60.

The switch unit 10 may include the first switch unit 10/111.

The first terminal of the first step-up unit 41 may be electrically connected to the total voltage signal terminal DC, and the second terminal of the first step-up unit 41 may be electrically connected to the first signal input terminal V1 of the first switch unit 10/111.

The first terminal of the first step-down unit 51 may be electrically connected to the total voltage signal terminal DC, and the second terminal of the first step-down unit 51 may be electrically connected to the first terminal of the first voltage stabilizer 31 and the first terminal of the second voltage stabilizer 32.

The second terminal of the first voltage stabilizer 31 and the second terminal of the second voltage stabilizer 32 may both be electrically connected to the integrated chip 20.

The signal output terminal OUT1 of the first switch unit 10/111 may be electrically connected to the connector 60.

For example, in addition to the FPGA chip and various switch units 10 provided above, the drive circuit 100 provided in the present disclosure may also include other components. The present disclosure provides an optional embodiment as described below.

It should be noted that the first switch unit 111 may be exemplarily shown in FIG. 2, FIG. 4, and FIG. 6. However, the first switch unit as the structure shown in FIG. 2 may be taken as an example in FIG. 9, and the first switch unit as the structure shown in FIG. 4 may be taken as an example in FIG. 10, which may not be limited in the present disclosure. The switch unit in FIG. 9 may also be the switch unit 10 shown in FIG. 6.

The switch unit 10 in the drive circuit 100 may be selected as one first switch unit 10/111, where the first switch unit 10/111 may be a Source switch unit. The source switch unit may be characterized in that its third module 13 may include the second control signal terminal S2 and the third transistor Q3; or the third module 13 may include the fifth resistor R5, the sixth resistor R6, the seventh resistor R7, the third transistor Q3, the fifth transistor Q5, and the fourth signal input terminal V4.

At this point, the first terminal and the second terminal of the first step-up unit 41 further included in the drive circuit 100 may be electrically connected to the total voltage signal terminal DC and the first signal input terminal V1 of the first switch unit 10/111, respectively; and the total voltage signal terminal DC may transmit the electrical signal to the first signal input terminal V1 of the Source switch unit through the first step-up unit 41.

For the first step-down unit 51 further included in the drive circuit 100, the first terminal may be configured to be electrically connected to the total voltage signal terminal DC; and the second terminal may be electrically connected to the first voltage stabilizer 31 and the second voltage stabilizer 32 respectively. The total voltage signal terminal DC may realize the electrical signal transmission to the FPGA chip through the first step-down unit 51, the first voltage stabilizer 31, and the second voltage stabilizer 32, which may make the electrical signal transmitted to the FPGA chip more stable, thereby ensuring that the drive signal required for the normal operation of the FPGA chip is more stable.

The signal output terminal OUT1 of the Source switch unit may be electrically connected to the connector 60 in the drive circuit 100; and the connector 60 may be configured to be electrically connected to a flexible printed circuit (FPC) board (not shown) in the microfluidic apparatus which may be used as a bridge part between the FPC and the drive circuit 100.

It should be further noted that the drive circuit 100 may further include the first voltage signal terminal Vcom, and Vcom may also be electrically connected to the FPC through the connector 60; and the ground terminals in the connector 60 and the source switch unit may be configured to be grounded at a same position, thereby ensuring the ground potential balance of a corresponding position in the circuit.

Referring to FIGS. 8-10, optionally, the first switch unit 10/111 may further include the fourth signal input terminal V4; and the fourth signal input terminal V4 may be electrically connected to the total voltage signal terminal DC.

For example, when the third module 13 of the Source switch unit includes the fourth signal input terminal V4, the present disclosure provides an optional configuration manner that the fourth signal input terminal V4 may be directly and electrically connected to the total voltage signal terminal DC, that is, the total voltage signal terminal DC may directly provide the electrical signal to the fourth signal input terminal V4, without passing through other components/devices.

The selectable value range of the voltage signal that can be received by the fourth signal input terminal V4 provided in the present disclosure may be, optionally, about 10V-14V, and the voltage of the total voltage signal terminal DC may be normally about 12V. For such configuration, the total voltage signal terminal DC may provide the voltage required by the fourth signal input terminal V4. Therefore, it may ensure that the voltage signal transmitted to the control electrode of the third transistor Q3 may have a sufficient voltage difference with the second electrode of the third transistor Q3, such that the third transistor Q3 may be normally turned on for conduction during the operation in the circuit.

Figure 11:
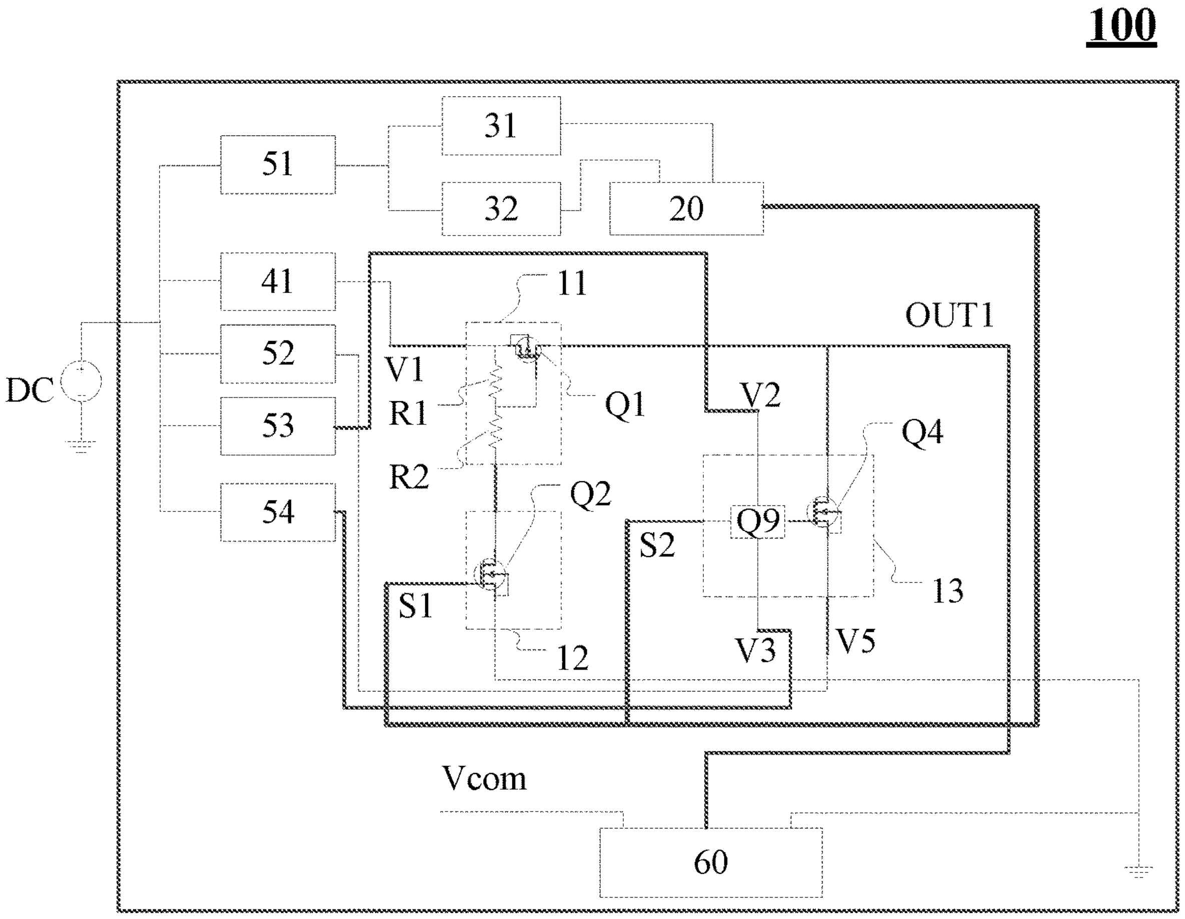
FIG. 11 illustrates another schematic of an exemplary drive circuit according to various embodiments of the present disclosure.
Figure 12:
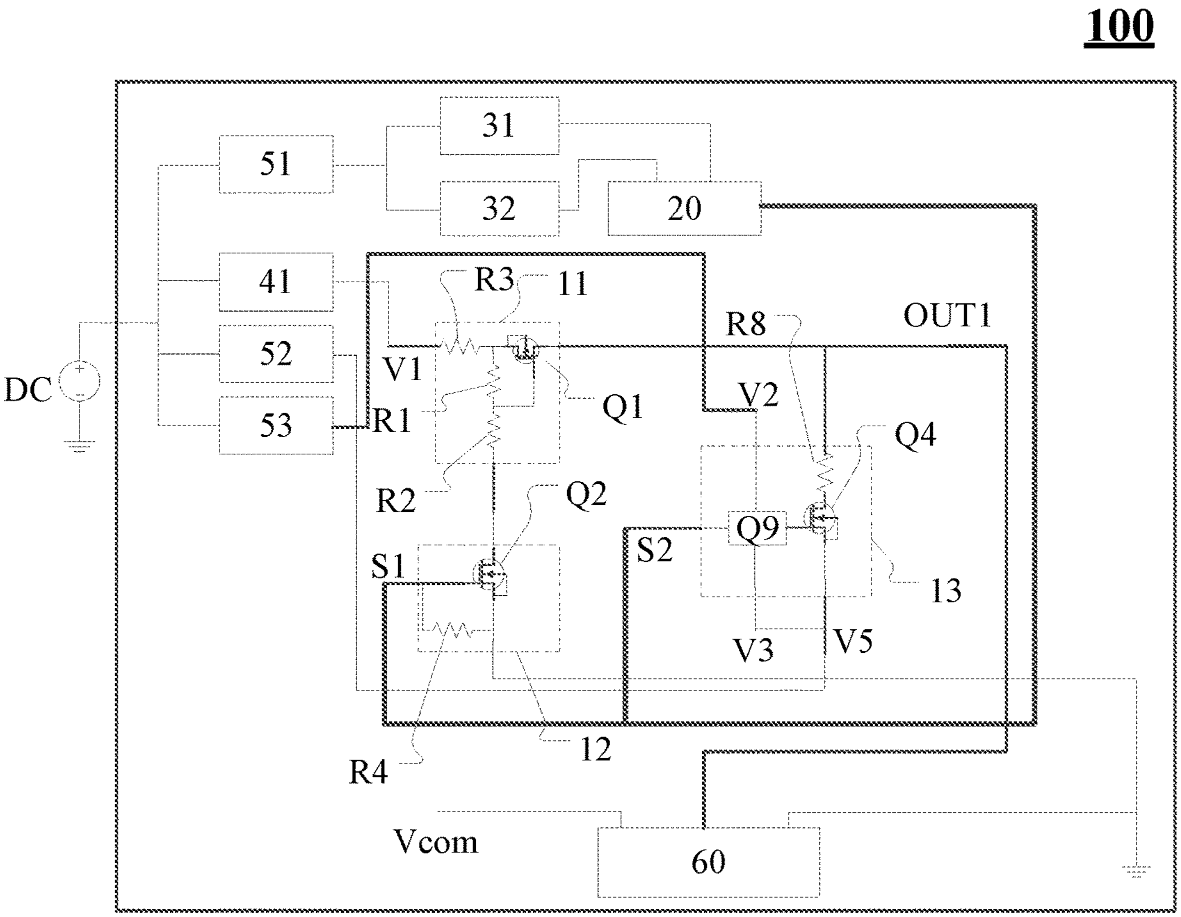
FIG. 12 illustrates another schematic of an exemplary drive circuit according to various embodiments of the present disclosure.

FIG. 11 illustrates another schematic of an exemplary drive circuit according to various embodiments of the present disclosure; and FIG. 12 illustrates another schematic of an exemplary drive circuit according to various embodiments of the present disclosure. Referring to FIGS. 8, 11, and 12, optionally, the drive circuit 100 may further include the first step-up unit 41, the first step-down unit 51, the second step-down unit 52, the third step-down unit 53, the fourth step-down unit 54, the first voltage stabilizer 31, the second voltage stabilizer 32, the total voltage signal terminal DC, and the connector 60.

The switch unit 10 may include the second switch unit 10/112.

The first terminal of the first step-up unit 41 may be electrically connected to the total voltage signal terminal DC, and the second terminal of the first step-up unit 41 may be electrically connected to the first signal input terminal V1 of the second switch unit 10/112.

The first terminal of the first step-down unit 51 may be electrically connected to the total voltage signal terminal DC, and the second terminal of the first step-down unit 51 may be electrically connected to the first terminal of the first voltage stabilizer 31 and the first terminal of the second voltage stabilizer 32.

The first terminal of the second step-down unit 52 may be electrically connected to the total voltage signal terminal DC, and the second terminal of the second step-down unit 52 may be electrically connected to the signal terminal V5 of the second switch unit 10/112.

The first terminal of the third step-down unit 53 may be electrically connected to the total voltage signal terminal DC, and the second terminal of the third step-down unit 53 may be electrically connected to the second signal input terminal V2 of the second switch unit 10/112.

The first terminal of the fourth step-down unit 54 may be electrically connected to the total voltage signal terminal DC, and the second terminal of the fourth step-down unit 54 may be electrically connected to the third signal input terminal V3 of the second switch unit 10/112.

The second terminal of the first voltage stabilizer 31 and the second terminal of the second voltage stabilizer 32 may both be electrically connected to the integrated chip 20.

The signal output terminal OUT1 of the second switch unit 10/112 may be electrically connected to the connector 60.

For example, in addition to the FPGA chip and various switch units 10 provided above, the drive circuit 100 provided in the present disclosure may further include other components. The present disclosure provides an optional embodiment as described below.

The switch unit 10 in the drive circuit 100 may be selected as the second switch unit 10/112; and the second switch unit 10/112 hereon may be a Gate switch unit. The characterization of the Gate switch unit is that its third module 13 may include the single-pole double-throw switch Q9, the second control signal terminal S2, the second signal input terminal V2, the third signal input terminal V3, and the fourth transistor Q4; or the third module 13 may further include the eighth transistor R8.

At this point, two terminals of the first step-up unit 41 further included in the drive circuit 100 may be configured to be electrically connected to the total voltage signal terminal DC and the first signal input terminal V1 of the Gate switch unit, respectively. The total voltage signal terminal DC may transmit the electrical signal to the first signal input terminal V1 of the Gate switch unit through the first step-up unit 41.

The drive circuit 100 may further include the first step-down unit 51. The first terminal of the first step-down unit 51 may be electrically connected to the total voltage signal terminal DC, and the second terminal of the first step-down unit 51 may be electrically connected to the first voltage stabilizer 31 and the second voltage stabilizer 32 respectively. The total voltage signal terminal DC may realize the electrical signal transmission to the FPGA chip through the first step-down unit 51, the first voltage stabilizer 31, and the second voltage stabilizer 32, which may make the electrical signal transmitted to the FPGA chip more stable, thereby ensuring that the drive signal required for the normal operation of the FPGA chip is more stable.

The drive circuit 100 may further include the second step-down unit 52. Two terminals of the second step-down unit 52 may be electrically connected to the total voltage signal terminal DC and the signal terminal V5 in the Gate switch unit respectively. The total voltage signal terminal DC may transmit the electrical signal to the signal terminal V5 in the Gate switch unit through the second step-down unit 52, thereby ensuring that the magnitude of the electrical signal transmitted to the signal terminal V5 is more suitable. The excessive voltage situation may be avoided, and the normal operation of the switch unit 10 may be ensured.

The drive circuit 100 may further include the third step-down unit 53. Two terminals of the third step-down unit 53 may be electrically connected to the total voltage signal terminal DC and the second signal input terminal V2 in the Gate switch unit respectively. The total voltage signal terminal DC may transmit the electrical signal to the second signal input terminal V2 in the Gate switch unit through the third step-down unit 53, thereby ensuring that the magnitude of the electrical signal transmitted to the second signal input terminal V2 is more suitable. The excessive voltage situation may be avoided, and the normal operation of the switch unit 10 may be ensured.

The drive circuit 100 may further include the fourth step-down unit 54. Two terminals of the fourth step-down unit 54 may be electrically connected to the total voltage signal terminal DC and the third signal input terminal V3 in the Gate switch unit respectively. The total voltage signal terminal DC may transmit the electrical signal to the third signal input terminal V3 in the Gate switch unit through the fourth step-down unit 54, thereby ensuring that the magnitude of the electrical signal transmitted to the third signal input terminal V3 is more suitable. The excessive voltage situation may be avoided, and the normal operation of the switch unit 10 may be ensured.

The signal output terminal OUT1 of the gate switch unit may be electrically connected to the connector 60 in the drive circuit 100. The connector 60 may be configured to be electrically connected to the FPC (flexible printed circuit) in the microfluidic apparatus, which may be used as a bridge part between the FPC and the drive circuit 100.

It should be further noted that the drive circuit 100 may further include the first voltage signal terminal Vcom, and Vcom may also be electrically connected to the FPC through the connector 60; and the connector 60 and the ground terminal in the Gate switch unit may be configured to be grounded at a same position, thereby ensuring the ground potential balance of a corresponding position in the circuit.

Referring to FIG. 2, optionally, the second step-down unit 52 may be reused as the fourth step-down unit 54.

For example, when the third signal input terminal V3 and the signal terminal V5 in the Gate switch unit receive a same signal, the present disclosure provides an optional configuration manner for the drive circuit 100 described as the following. The above-mentioned second step-down unit 52 may be reused as the fourth step-down unit 54; the electrical signal transmission to the third signal input terminal V3 and the signal terminal V5 may be realized simultaneously through one second step-down unit 52; and based on ensuring the normal operation of the drive circuit 100, the complexity of the design of the drive circuit 100 may be reduced.

Figure 13:
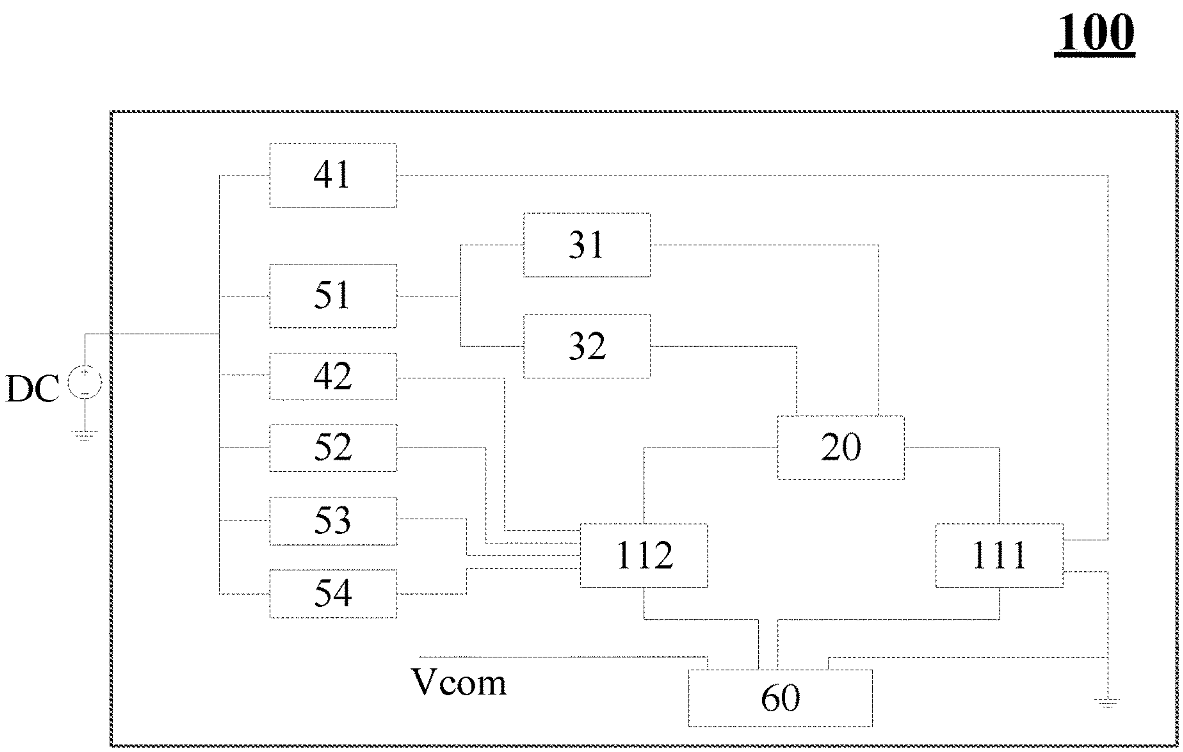
FIG. 13 illustrates another schematic of an exemplary drive circuit according to various embodiments of the present disclosure.

FIG. 13 illustrates another schematic of an exemplary drive circuit according to various embodiments of the present disclosure. Referring to FIGS. 9, 12, and 13, optionally, the drive circuit 100 may further include the first step-up unit 41, the second step-up unit 42, the first step-down unit 51, the second step-down unit 52, the third step-down unit 53, the fourth step-down unit 54, the first voltage stabilizer 31, the second voltage stabilizer 32, the total voltage signal terminal DC, and the connector 60.

The switch units 10 may include the first switch unit 10/111 and the second switch unit 10/112.

The first terminal of the first step-up unit 41 may be electrically connected to the total voltage signal terminal DC, and the second terminal of the first step-up unit 41 may be electrically connected to the first signal input terminal V1 of the first switch unit 10/111.

The first terminal of the second step-up unit 42 may be electrically connected to the total voltage signal terminal DC, and the second terminal of the second step-up unit 42 may be electrically connected to the first signal input terminal V1 of the second switch unit 10/112.

The first terminal of the first step-down unit 51 may be electrically connected to the total voltage signal terminal DC, and the second terminal of the first step-down unit 51 may be electrically connected to the first terminal of the first voltage stabilizer 31 and the first terminal of the second voltage stabilizer 32.

The first terminal of the second step-down unit 52 may be electrically connected to the total voltage signal terminal DC, and the second terminal of the second step-down unit 52 may be electrically connected to the signal terminal V5 of the second switch unit 10/112.

The first terminal of the third step-down unit 53 may be electrically connected to the total voltage signal terminal DC, and the second terminal of the third step-down unit 53 may be electrically connected to the second signal input terminal V2 of the second switch unit 10/112.

The first terminal of the fourth step-down unit 54 may be electrically connected to the total voltage signal terminal DC, and the second terminal of the fourth step-down unit 54 may be electrically connected to the third signal input terminal V3 of the second switch unit 10/112.

The second terminal of the first voltage stabilizer 31 and the second terminal of the second voltage stabilizer 32 may both be electrically connected to the integrated chip 20.

The signal output terminals OUT1 of the first switch unit 10/111 and the second switch unit 10/112 may both be electrically connected to the connector 60.

For example, the drive circuit 100 provided in the present disclosure may include the FPGA chip and a plurality of switch units 10. The switch units 10 in the drive circuit 100 may optionally include both the first switch unit 10/111 and the second switch unit 10/112. Herein, the first switch unit 10/111 may be a Source switch unit, and the second switch unit 10/112 may be a Gate switch unit. The difference between the Source switch unit and the Gate switch unit is the configuration of the components/devices and terminals in the third module 13. The differences may be as described above, which may not be described in detail herein.

In the present disclosure, FIGS. 2, 4, and 6 illustrate optional embodiments of the Source switch unit, and FIGS. 3, 5, and 7 illustrate optional embodiments of the Gate switch unit.

It should be noted that detailed circuit structure of the first switch unit 10/111 and the second switch unit 10/112 may not be shown in FIG. 13, which may refer to FIGS. 9-12 and FIGS. 2-7.

At this point, the first terminal and the second terminal of the first step-up unit 41 further included in the drive circuit 100 may be electrically connected to the total voltage signal terminal DC and the first signal input terminal V1 of the first switch unit 10/111, respectively. The total voltage signal terminal DC may transmit the electrical signal to the first signal input terminal V1 of the Source switch unit through the first step-up unit 41.

Two terminals of the second step-up unit 42 further included in the drive circuit 100 may be electrically connected to the total voltage signal terminal DC and the first signal input terminal V1 of the Gate switch unit, respectively. The total voltage signal terminal DC may transmit the electric signal to the first signal input terminal V1 of the Gate switch unit through the second step-up unit 42.

For the first step-down unit 51 further included in the drive circuit 100, the first terminal may be electrically connected to the total voltage signal terminal DC, and the second terminal may be electrically connected to the first voltage stabilizer 31 and the second voltage stabilizer 32, respectively. The total voltage signal terminal DC may realize the electrical signal transmission to the FPGA chip through the first step-down unit 51, the first voltage stabilizer 31, and the second voltage stabilizer 32, which may make the electrical signal transmitted to the FPGA chip more stable, thereby ensuring that the drive signal required for the normal operation of the FPGA chip is more stable.

The drive circuit 100 may further include the second step-down unit 52. Two terminals of the second step-down unit 52 may be electrically connected to the total voltage signal terminal DC and the signal terminal V5 in the Gate switch unit, respectively. The total voltage signal terminal DC may transmit the electrical signal to the signal terminal V5 in the Gate switch unit through the second step-down unit 52, which may ensure that the magnitude of the electrical signal transmitted to the signal terminal V5 is more suitable. The excessive voltage situation may be avoided, and the normal operation of the switch unit 10 may be ensured.

The drive circuit 100 may further include the third step-down unit 53. Two terminals of the third step-down unit 53 may be electrically connected to the total voltage signal terminal DC and the second signal input terminal V2 in the Gate switch unit, respectively. The total voltage signal terminal DC may transmit the electrical signal to the second signal input terminal V2 of the Gate switch unit through the third step-down unit 53, which may ensure that the electrical signal transmitted to the second signal input terminal V2 is more suitable. The excessive voltage situation may be avoided, and the normal operation of the switch unit 10 may be ensured.

The drive circuit 100 may further include the fourth step-down unit 54. Two terminals of the fourth step-down unit 54 may be electrically connected to the total voltage signal terminal DC and the third signal input terminal V3 in the Gate switch unit, respectively. The total voltage signal terminal DC may transmit the electrical signal to the third signal input terminal V3 of the Gate switch unit through the fourth step-down unit 54, which may ensure that the electrical signal transmitted to the third signal input terminal V3 is more suitable. The excessive voltage situation may be avoided, and the normal operation of the switch unit 10 may be ensured.

The signal output terminals OUT1 of the Source switch unit and the Gate switch unit may both be electrically connected to the connector 60 in the drive circuit 100. The connector 60 may be configured to be electrically connected to the FPC (flexible printed circuit) in the microfluidic apparatus, which may be used as a bridge part between the FPC and the drive circuit 100.

It should be noted that, if it is an active digital microfluidic apparatus, the drive circuit 100 may need to include both the Source switch unit and the Gate switch unit, and the source and gate signals may be connected from the connector 60; if it is a passive digital microfluidic apparatus, the drive circuit 100 may include only the Source switch unit or only the Gate switch unit in the drive circuit 100, that is, the source or gate signal may be connected separately from the connector 60.

When the drive circuit 100 includes the first switch unit 10/111 and the second switch unit 10/112, and when the Source switch unit (the first switch unit 10/111) of the drive circuit 100 includes the fourth signal input terminal V4, the present disclosure provides a configuration manner of the drive circuit 100 as follows. The fourth signal input terminal V4 of the Source switch unit may be electrically connected to the total voltage signal terminal DC. That is, the total voltage signal terminal DC may directly provide the electrical signal to the fourth signal input terminal V4 without passing through other components/devices.

When the drive circuit 100 includes the first switch unit 10/111 and the second switch unit 10/112, and when the third signal input terminal V3 and the signal terminal V5 in the Gate switch unit receive a same signal, the present disclosure provides an optional configuration manner for the drive circuit 100 as follows. The above-mentioned second step-down unit 52 may be reused as the fourth step-down unit 54; the electrical signal transmission to the third signal input terminal V3 and the signal terminal V5 may be realized simultaneously through one second step-down unit 52; and based on ensuring the normal operation of the drive circuit 100, the complexity of the design of the drive circuit 100 may be reduced.

Referring to FIGS. 1-13, optionally, the voltage signal received by the first signal input terminal V1 is V1; the switch units 10 may include the first switch unit 10/111 and the second switch unit 10/112.

In the first switch unit 10/111, V1≥40V; and in the second switch unit 10/112, V1≥50V.

For example, in the above-mentioned drive circuit 100 provided in the present disclosure, whether the drive circuit 100 includes only the first switch unit 10/111 (the Source switch unit), or only includes the second switch unit 10/112 (the Gate switch unit), or includes both the Source switch unit and the Gate switch unit, in order to meet the magnitude of the electrical signal required by the first signal input terminal V1, the present disclosure may provide that the value range of the voltage signal to be received by the first signal input terminal V1 of the first switch unit 10/111 (the Source switch unit) is greater than or equal to 40V, and the value range of the voltage signal to be received by the first signal input terminal V1 of the second switch unit 10/112 (the Gate switch unit) is greater than or equal to 50V. Therefore, it ensures that the microfluidic apparatus voltage finally transmitted by the switch unit 10 may be sufficiently enough to drive the liquid droplets in the microfluidic apparatus.

It should be noted that, referring to above-mentioned embodiments of the present disclosure, a new type of the Source switch unit and/or the Gate switch unit may be rebuilt by using devices including MOS transistors, resistors, and the like; and the field-programmable gate array (FPGA) output signal may be used to control each drive unit to output signals according to any time sequence. Herein, the high level of the output signal of the new type of the Source switch unit and the Gate switch unit may reach 200V or more. That is, the output voltage and time sequence of the Source switch unit and the Gate switch unit may meet the drive requirements of the drive electrodes that are electrically connected with the Source switch unit and the Gate switch unit, thereby solving the problems of insufficient driving voltage and poor driving effect in the existing technology.

Figure 14:
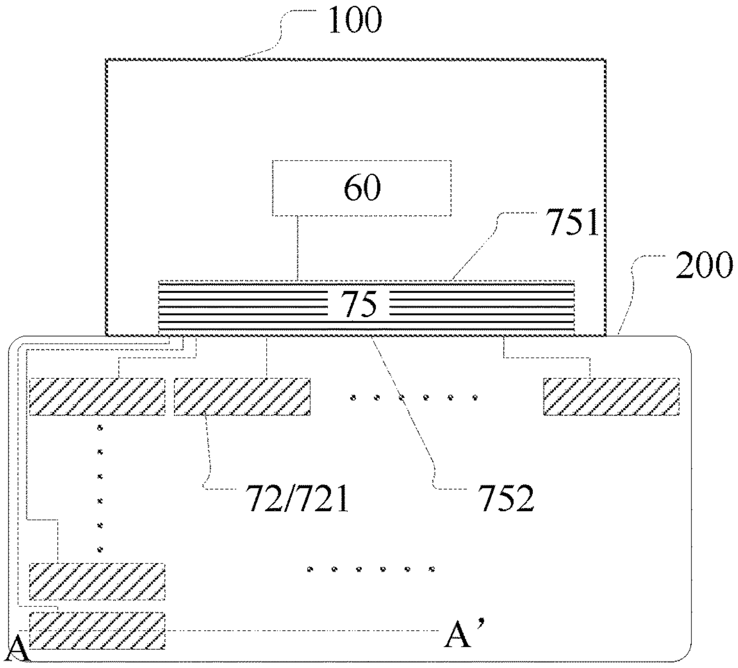
FIG. 14 illustrates a connection schematic between a microfluidic apparatus and a drive circuit according to various embodiments of the present disclosure.
Figure 15:
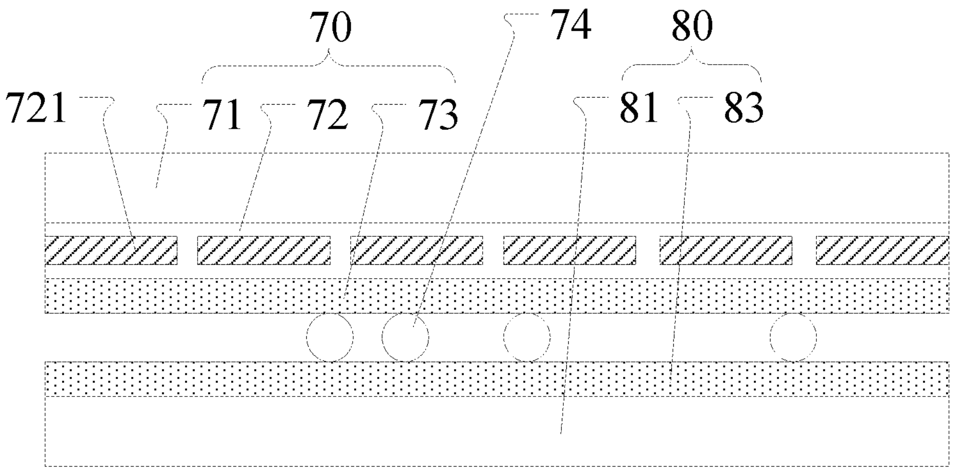
FIG. 15 illustrates a cross-sectional view along an AA' direction in FIG. 14 according to various embodiments of the present disclosure.

FIG. 14 illustrates a connection schematic between a microfluidic apparatus and a drive circuit according to various embodiments of the present disclosure; and FIG. 15 illustrates a cross-sectional view along an AA' direction in FIG. 14 according to various embodiments of the present disclosure. Referring to FIGS. 14-15, based on the same inventive concept, the present disclosure also provides a microfluidic apparatus 200.

The microfluidic apparatus 200 may include the first substrate 70 and the second substrate 80 disposed oppositely; a drive electrode layer 72 which is located on the first substrate 70 and includes a plurality of drive electrodes 721; the first insulating layer 73 located on the side of the drive electrode layer 72 facing the second substrate 80; the second insulating layer 83 which is located on the second substrate 80 and adjacent to the side of the first insulating layer 73; and a passage which is formed between the first insulating layer 73 and the second insulating layer 83 and used to accommodate the liquid droplets 74.

The drive circuit 100 may be electrically connected to the drive electrode 721; and the drive circuit 100 may be any drive circuit 100 provided in the present disclosure.

For example, the present disclosure also provides the microfluidic apparatus 200, and the above-mentioned drive circuit 100 of the microfluidic apparatus may be used for the microfluidic apparatus 200.

The microfluidic apparatus 200 provided in the present disclosure may at least include the drive electrode layer 72 and the first insulating layer 73 located in the first substrate 70, and the second insulating layer 83 located in the second substrate 80; and further include the passage for accommodating the liquid droplets 74 formed between first insulating layer 73 and the second insulating layer 83 which are adjacent and opposite with each other. The signal output terminal OUT1 of the switch unit 10 in the above-mentioned drive circuit 100 may be electrically connected to each drive electrode 721 in the drive electrode layer 72, which is configured to, through the drive circuit 100, provide corresponding drive signals to at least a part of the drive electrodes 721 that need to work. For example, by transmitting the first signal and the second signal outputted by the drive circuit 100 to two adjacent drive electrodes 721 in the microfluidic apparatus 200 simultaneously and forming the electric field between adjacent drive electrodes 721 by drive signals of different magnitudes, the liquid droplets 74 may be driven and moved by different electric fields generated by the drive electrodes 721, thereby realizing the actions of the liquid droplets 74 such as movement, mixing, and separation, where 71/81 shown in FIG. 14 may be the substrate layer.

Referring to FIGS. 1-15, optionally, the drive circuit 100 may include the connector 60 and the flexible printed circuit 75; and the connector 60 may be electrically connected to the first port 751 of the flexible printed circuit 75.

The drive electrode 721 may be electrically connected to the second port 752 of the flexible printed circuit 75.

For example, the drive circuit 100 of the microfluidic apparatus 200 provided in the present disclosure may further include the connector 60 and the flexible printed circuit 75 (FPC). The connector 60 may be electrically connected to the signal input terminal (the first port 751) of the flexible printed circuit 75, and the second port 752 of the flexible printed circuit 75 may be electrically connected to the drive electrode, which may be configured to transmit the drive signal outputted by the switch unit 10 to the drive electrode 721 after passing through the connector 60 and the flexible printed circuit 75. Corresponding drive signals may be provided to at least a part of the drive electrodes 721 that need to work through the drive circuit 100, thereby realizing the driving of the liquid droplets 74 in the area corresponding to the drive electrode 721 and the movement of the liquid droplets 74.

Herein, it should also be noted that the drive circuit 100 provided in the present disclosure may be disposed on the periphery of the microfluidic apparatus 200. The electrical signals outputted by the drive circuit 100 may be respectively transmitted to the drive electrodes 721 in the microfluidic apparatus 200 through the flexible printed circuit 75. By transmitting the first signal and the second signal outputted by the drive circuit 100 to two adjacent drive electrodes 721 in the microfluidic apparatus 200 simultaneously and forming the electric field between adjacent drive electrodes 721 by drive signals of different magnitudes, it may realize that the liquid droplets 74 may move under the driving of different electric fields generated by the drive electrodes 721.

Figure 16:
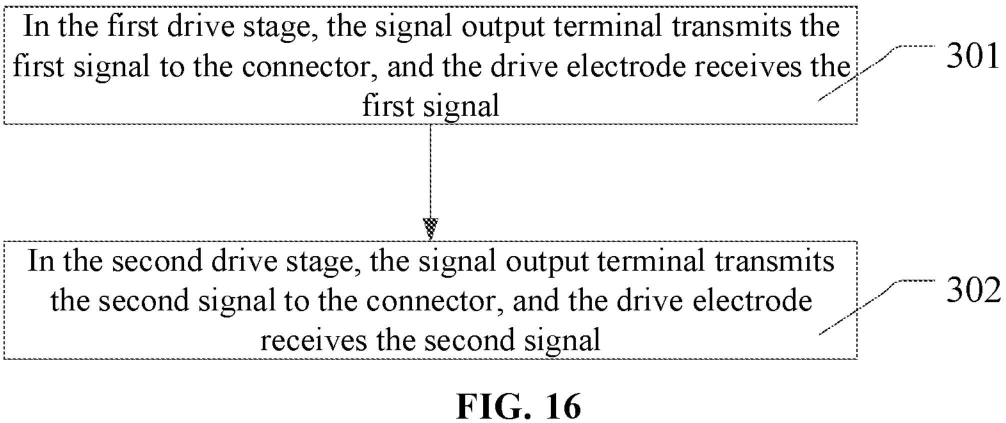
FIG. 16 illustrates a flowchart of a drive method of a microfluidic apparatus according to various embodiments of the present disclosure.

FIG. 16 illustrates a flowchart of a drive method of a microfluidic apparatus according to various embodiments of the present disclosure. Referring to FIGS. 1-16, based on a same inventive concept, the present disclosure also provides a drive method of the microfluidic apparatus 200, which is used in the above-mentioned microfluidic apparatus 200. The microfluidic apparatus 200 may be any microfluidic apparatus 200 provided by the present disclosure.

The drive circuit 100 may include the switch unit 10; and the switch unit 10 may include the signal output terminal OUT1, the first signal input terminal V1, and the signal terminal V5. The signal output terminal OUT1 may output the first signal of the first signal input terminal V1 or the second signal of the signal terminal V5.

The drive method may include the first drive stage and the second drive stage.

At 301, in the first drive stage, the signal output terminal OUT1 may transmit the first signal to the connector 60, and the drive electrode may receive the first signal.

At 302, in the second drive stage, the signal output terminal OUT1 may transmit the second signal to the connector 60, and the drive electrode may receive the second signal.

For example, the present disclosure also provides the drive method of the microfluidic apparatus 200, which is configured for the switch unit 10 in the above-mentioned drive circuit 100 of the microfluidic apparatus 200.

The drive method provided in the present disclosure may include the first drive stage and the second drive stage. In the first drive stage, the signal output terminal OUT1 of the switch unit 10 may output the first signal inputted from the first signal input terminal V1, such that, at this point, the drive signal received by the drive electrode electrically connected to the drive circuit 100 may be the first signal. In the second drive stage, the signal output terminal OUT1 of the switch unit 10 may output the second signal inputted from the signal terminal V5, such that, at this point, the drive signal received by the drive electrode electrically connected to the drive circuit 100 may be the second signal.

Figure 17:
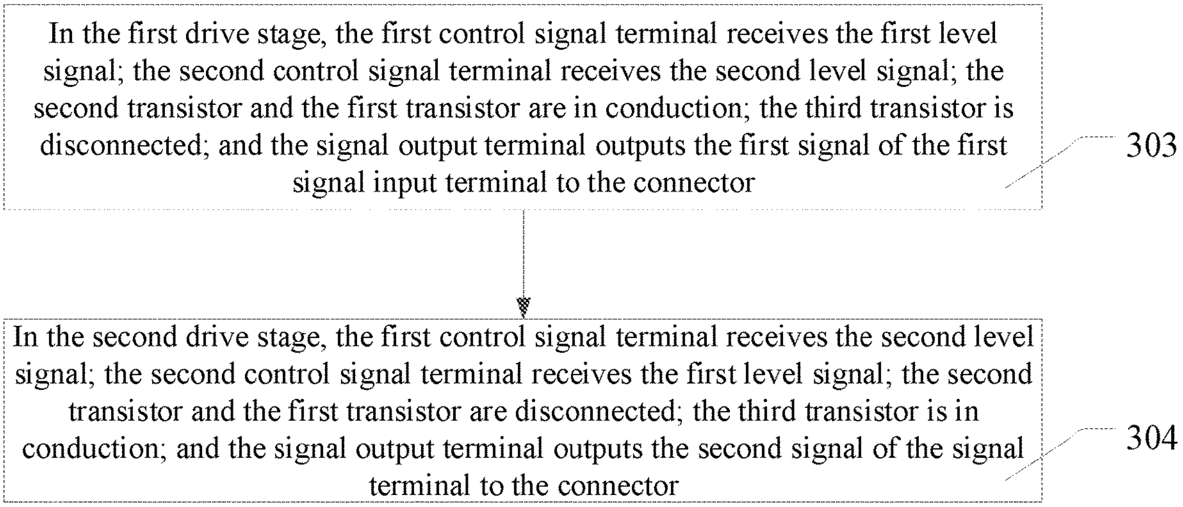
FIG. 17 illustrates another flowchart of a drive method of a microfluidic apparatus according to various embodiments of the present disclosure.

FIG. 17 illustrates another flowchart of a drive method of a microfluidic apparatus according to various embodiments of the present disclosure. Referring to FIGS. 1-15, and 17, optionally, the switch unit 10 may further include the first resistor R1, the second resistor R2, the first control signal terminal S1, the second control signal terminal S2, the first transistor Q1, the second transistor Q2, and the third transistor Q3.

The drive method may include the following. At 303, in the first drive stage, the first control signal terminal S1 may receive the first level signal, the second control signal terminal S2 may receive the second level signal, the second transistor Q2 and the first transistor Q1 may be in conduction, the third transistor Q3 may be disconnected, and the signal output terminal OUT1 may output the first signal of the first signal input terminal V1 to the connector 60. At 304, in the second drive stage, the first control signal terminal S1 may receive the second level signal, the second control signal terminal S2 may receive the first level signal, the second transistor Q2 and the first transistor Q1 may be disconnected, the third transistor Q3 may be in conduction, and the signal output terminal OUT1 may output the second signal of the signal terminal V5 to the connector 60.

For example, when the switch unit 10 in the drive circuit 100 is the first switch unit 10/111 (the Source switch unit); when the first module 11 in the switch unit 10 includes, for example, the first signal input terminal V1, the first resistor R1, the second resistor R2, and the first transistor Q1; when the second module 12 includes, for example, the first control signal terminal S1, the second transistor Q2; and also when the third module 13 includes, for example, the signal output terminal OUT1, the second control signal terminal S2, the third transistor Q3, and the signal terminal V5, the drive method provided in the present disclosure may still include at least the first drive stage and the second drive stage. In the first drive stage, the first step may be to simultaneously transmit the second level signal, which may be, for example, a low-level signal, to the first control signal terminal S1 and the second control signal terminal S2. The second step may be to adjust the first control signal terminal S1 to receive the second level signal, which can be a high-level signal; and the second control signal terminal S2 may still receive the first level signal. At this point, the high-level signal transmitted from the first control signal terminal S1 may drive the second transistor Q2 to be in conduction, and the second resistor R2 may be grounded. Due to the voltage division of the first resistor R1 and the second resistor R2, a voltage difference may be between the control electrode and the first electrode of the first transistor Q1, such that the first transistor Q1 may be in conduction. Since the second control signal terminal S2 transmits the low-level signal, the third transistor Q3 may be in disconnection state; and at this point, the signal output terminal OUT1 may transmit the signal inputted by the first signal input terminal V1. That is, the first signal of the first signal input terminal V1 may be outputted to the connector 60.

In the second drive stage, the first step may be to simultaneously transmit the second level signal, which may be, for example, a low-level signal, to the first control signal terminal S1 and the second control signal terminal S2. The second step may be that the first control signal terminal S1 may still receive the second level signal, and the second control signal terminal S2 may be adjusted to receive the first level signal, which may be, for example, a high-level signal. Since the first control signal terminal S1 transmits the low-level signal to the control electrode of the second transistor Q2, the second transistor Q2 may be in a disconnection state. At this point, no voltage difference may be between the control electrode and the first electrode of the first transistor Q1, such that the first transistor Q1 may also be in the disconnection state. The second control signal terminal S2 and the control electrode of the third transistor Q3 may transmit the high-level signal to drive the third transistor Q3 to be in conduction. At this point, the signal output terminal OUT1 may transmit the signal inputted from the signal terminal V5, and the signal output terminal OUT1 may output the second signal of the signal terminal V5 to the connector 60.

In the first drive stage, the switch unit 10 may output the first signal of the first signal input terminal V1 to the connector 60. The present disclosure provides that the ground voltage of the first signal input terminal V1 in the Source switch unit is not lower than 40V, such that the voltage magnitude of the first signal transmitted to the connector 60 may be sufficiently large. When the first signal is finally transmitted to the corresponding drive electrode, the drive voltage received by the drive electrode may be sufficient to drive and move the liquid droplets 74.

Figure 18:
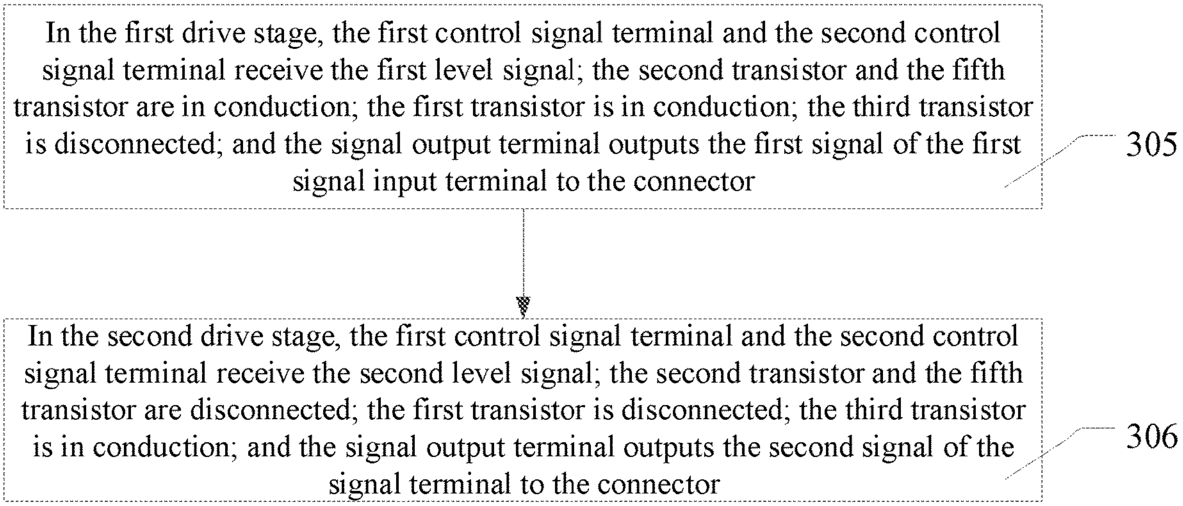
FIG. 18 illustrates another flowchart of a drive method of a microfluidic apparatus according to various embodiments of the present disclosure.

FIG. 18 illustrates another flowchart of a drive method of a microfluidic apparatus according to various embodiments of the present disclosure. Referring to FIGS. 1-15, and 18, optionally, the switch unit 10 may further include the first resistor R1, the second resistor R2, the third resistor R3, the fourth resistor R4, the fifth resistor R5, the sixth resistor R6, the seventh resistor R7, the first control signal terminal S1, the second control signal terminal S2, the first transistor Q1, the second transistor Q2, the third transistor Q3, the fifth transistor Q5, and the fourth signal input terminal V4.

The drive method may include the following. At 305, in the first drive stage, the first control signal terminal S1 and the second control signal terminal S2 may receive the first level signal, the second transistor Q2 and the fifth transistor Q5 may be in conduction, the first transistor Q1 may be in conduction, the third transistor Q3 may be disconnected, and the signal output terminal OUT1 may output the first signal of the first signal input terminal V1 to the connector 60. At 306, in the second drive stage, the first control signal terminal S1 and the second control signal terminal S2 may receive the second level signal, the second transistor Q2 and the fifth transistor Q5 may be disconnected, the first transistor Q1 may be disconnected, the third transistor Q3 may be in conduction, and the signal output terminal OUT1 may output the second signal of the signal terminal V5 to the connector 60.

For example, when the switch unit 10 in the drive circuit 100 is the first switch unit 10/111 (the Source switch unit); when the first module 11 in the switch unit 10, for example, includes the first signal input terminal V1, the first resistor R1, the second resistor R2, the first transistor Q and the third resistor R3; when the second module 12, for example, includes the first control signal terminal S1, the second transistor Q2 and the fourth resistor R4; and also when the third module 13, for example, includes the signal output terminal OUT1, the second control signal terminal S2, the fifth resistor R5, the sixth resistor R6, the seventh resistor R7, the third transistor Q3, the fifth transistor Q5, and the signal terminal V5, the drive method provided in the present disclosure may still include at least the first drive stage and the second drive stage. In the first drive stage, the first step may be to transmit the second level signal, which may be, for example, a low-level signal, to the first control signal terminal S1, and to transmit the first level signal, which may be, for example, a high-level signal, to the second control signal terminal S2. The high-level signal may be transmitted to the control electrode of the fifth transistor Q5 to drive the fifth transistor Q5 to be in conduction. At this point, the third transistor Q3 may be disconnected, and the low-level signal may be transmitted to the control electrode of the second transistor Q2, such that the second transistor Q2 may be in the disconnection state, and the first transistor Q1 may also be in the disconnection state at this point. The second step may be to adjust the first control signal terminal S1 to receive the first level signal. The second control signal terminal S2 may still receive the first level signal. At this point, the high-level signal transmitted from the first control signal terminal S1 may drive the second transistor Q2 to be in conduction, and the second resistor R2 may be grounded. The voltage division of the first resistor R1 and the second resistor R2 may result in the voltage difference between the control electrode and the first electrode of the first transistor Q1, such that the first transistor Q1 may be in conduction. Since the second control signal terminal S2 transmits the low-level signal, the third transistor Q3 may be in the disconnection state. At this point, the signal output terminal OUT1 may transmit the signal inputted from the first signal input terminal V1, that is, the first signal from the first signal input terminal V1 may be outputted to the connector 60.

In the second drive stage, the first step may be to transmit the second level signal, which may be, for example, a low-level signal, to the first control signal terminal S1, and to transmit the first level signal, which may be, for example, a high-level signal to the second control signal terminal S2. The low-level signal may be transmitted to the control electrode of the second transistor Q2, such that the second transistor Q2 is in the disconnection state, and the first transistor Q1 may also be in the disconnection state at this point. The high-level signal may be transmitted to the control electrode of the fifth transistor Q5 to drive the fifth transistor Q5 to be in the conduction state; and the third transistor Q3 may be in the disconnection state at this point. The second step may be that the first control signal terminal S1 may still receive the second level signal, and the second control signal terminal S2 may be adjusted to receive the second level signal. The first control signal terminal S1 transmits the low-level signal to the control electrode of the second transistor Q2, and the second transistor Q2 is in the disconnection state; therefore, the first transistor Q1 may also be in the disconnection state, the fifth transistor Q5 may still be in the conduction state, and the third transistor Q3 may also be in the conduction state. At this point, the signal output terminal OUT1 may transmit the signal inputted by the signal terminal V5; the signal output terminal OUT1 may output the second signal of the signal terminal V5 to the connector 60; and when the signal terminal V5 is grounded, the voltage transmitted to the signal output terminal OUT1 may be 0V.

In the first drive stage, the switch unit 10 may output the first signal of the first signal input terminal V1 to the connector 60. The present disclosure provides that the ground voltage to the first signal input terminal V1 in the Source switch unit may not be lower than 40V. Therefore, the voltage magnitude of the first signal transmitted to the connector 60 may be sufficiently large. When the first signal is finally transmitted to the corresponding drive electrode, the drive voltage received by the drive electrode may be sufficient to drive and move the liquid droplets 74.

Figure 19:
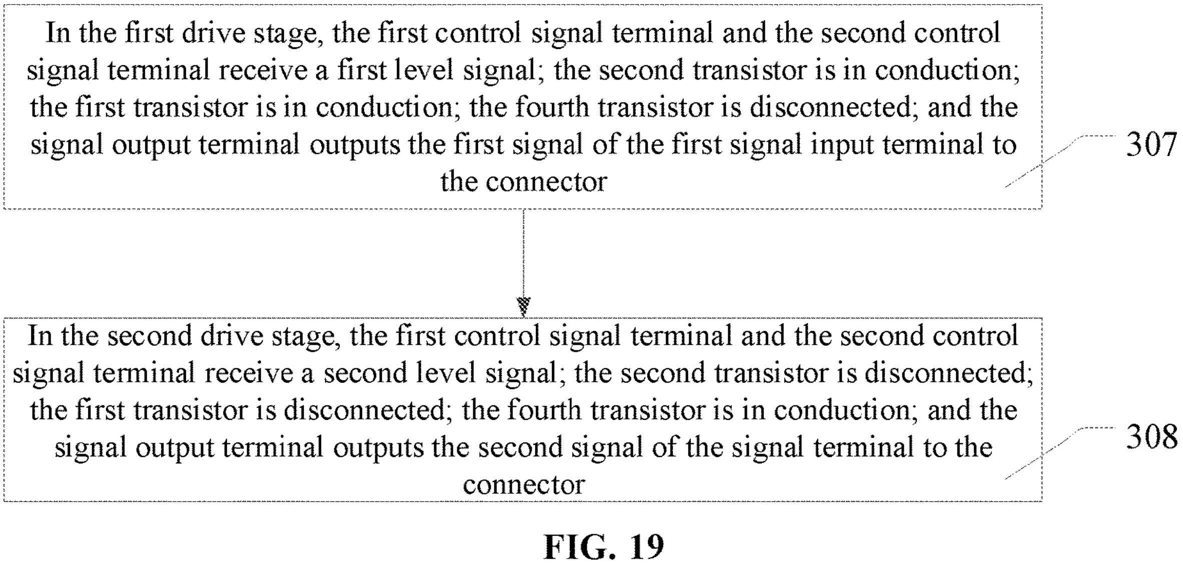
FIG. 19 illustrates another flowchart of a drive method of a microfluidic apparatus according to various embodiments of the present disclosure.

FIG. 19 illustrates another flowchart of a drive method of a microfluidic apparatus according to various embodiments of the present disclosure. Referring to FIGS. 1-15, and 19, optionally, the switch unit 10 may further include the first resistor R1, the second resistor R2, the first control signal terminal S1, the second control signal terminal S2, the first transistor Q1, the second transistor Q2, the fourth transistor Q4, the single pole double throw switch Q9, the second signal input terminal V2, and the third signal input terminal V3.

The drive method may include the following. At 307, in the first drive stage, the first control signal terminal S1 and the second control signal terminal S2 may receive the first level signal, the second transistor Q2 may be in conduction, the first transistor Q1 may be in conduction, the fourth transistor Q4 may be disconnected, and the signal output terminal OUT1 may output the first signal of the first signal input terminal V1 to the connector 60. At step 308, in the second drive stage, the first control signal terminal S1 and the second control signal terminal S2 may receive the second level signal, the second transistor Q2 may be disconnected, the first transistor Q1 may be disconnected, the fourth transistor Q4 may be in conduction, and the signal output terminal OUT1 may output the second signal of the signal terminal V5 to the connector 60.

For example, when the switch unit 10 in the drive circuit 100 is the second switch unit 10/112 (the Gate switch unit); when the first module 11 in the switch unit 10, for example, includes the first signal input terminal V1, the first resistor R1, the second resistor R2, and the first transistor Q1; when the second module 12, for example, includes the first control signal terminal S1 and the second transistor Q2; and also when the third module 13, for example, includes the signal output terminal OUT1, the second control signal terminal S2, the single-pole double-throw switch Q9, the second signal input terminal V2, the third signal input terminal V3, the fourth transistor Q4, and the signal terminal V5, the drive method provided in the present disclosure may still include at least the first drive stage and the second drive stage. In the first drive stage, the first step may be to transmit the second level signal, for example, a low-level signal, to the first control signal terminal S1, and to transmit the first level signal, for example, a high-level signal, to the second control signal terminal S2. At this point, the single-pole double-throw switch Q9 may receive the low-level signal inputted from the third signal input terminal V3 and transmit the low-level signal to the control electrode of the fourth transistor Q4, such that the fourth transistor Q4 may be in the disconnection state. The low-level signal of the first control signal terminal S1 may be transmitted to the second transistor Q2, such that the second transistor Q2 and the first transistor Q1 may both be in the disconnection state. The second step may be to adjust the first control signal terminal S1 to receive the high-level signal. The second control signal terminal S2 may still receive the high-level signal. At this point, the control electrode of the second transistor Q2 may receive the high-level signal, thereby driving both the second transistor Q2 and the first transistor Q1 to be in the conduction state. At this point, the fourth transistor Q4 may be still in the disconnection state, and the signal output terminal OUT1 may transmit the signal inputted by the first signal input terminal V1, that is, the first signal of the first signal input terminal V1 may be outputted to the connector 60.

In the second drive stage, the first step may be to transmit the second level signal, for example, the low-level signal, to the first control signal terminal S1, and to transmit the first level signal, for example, the high-level signal, to the second control signal terminal S2. At this point, the single-pole double-throw switch Q9 may receive the low-level signal inputted from the third signal input terminal V3 and transmit the low-level signal to the control electrode of the fourth transistor Q4, such that the fourth transistor Q4 may be in the disconnection state. The low-level signal of the first control signal terminal S1 may be transmitted to the second transistor Q2, such that the second transistor Q2 and the first transistor Q1 may both be in the disconnection state. The second step may be that the first control signal terminal S1 may still receive the low-level signal, and the second control signal terminal S2 may be adjusted to also receive the low-level signal. At this point, the control electrode of the second transistor Q2 may receive the low-level signal, such that the second transistor Q2 and the first transistor Q1 may both in the disconnection state. The high-level signal of the second signal input terminal V2 may be transmitted to the fourth transistor Q4 to drive the fourth transistor Q4 to be in the conduction state. At this point, the signal output terminal OUT1 may transmit the signal inputted from the signal terminal V5, and the signal output terminal OUT1 may output the second signal of the signal terminal V5 to the connector 60.

In the first drive stage, the switch unit 10 may output the first signal of the first signal input terminal V1 to the connector 60. The present disclosure provides that the ground voltage to the first signal input terminal V1 in the Gate switch unit may not be lower than 40V. Therefore, the voltage magnitude of the first signal transmitted to the connector 60 may be sufficiently large. When the first signal is finally transmitted to the corresponding drive electrode, the drive voltage received by the drive electrode may be sufficient to drive and move the liquid droplets 74.

Referring to FIG. 19, optionally, the switch unit 10 may further include the first resistor R1, the second resistor R2, the third resistor R3, the fourth resistor R4, the eighth resistor R8, the first control signal terminal S1, the second control signal terminal S2, the first transistor Q1, the second transistor Q2, the fourth transistor Q4, the single-pole double-throw switch Q9, the second signal input terminal V2, and the third signal input terminal V3.

The drive method may include the following. In the first drive stage, the first control signal terminal S1 and the second control signal terminal S2 may receive the first level signal, the second transistor Q2 may be in conduction, the first transistor Q1 may be in conduction, the fourth transistor Q4 may be disconnected, and the signal output terminal OUT1 may output the first signal of the first signal input terminal V1 to the connector 60. In the second drive stage, the first control signal terminal S1 and the second control signal terminal S2 may receive the second level signal, the second transistor Q2 may be disconnected, the first transistor Q1 may be disconnected, the fourth transistor Q4 may be in conduction, and the signal output terminal OUT1 may output the second signal of the signal terminal V5 to the connector 60.

For example, when the switch unit 10 in the drive circuit 100 is the second switch unit 10/112 (the Gate switch unit); when the first module 11 in the switch unit 10, for example, includes the first signal input terminal V1, the first resistor R1, the second resistor R2, the first transistor Q1 and the third resistor R3; when the second module 12, for example, includes the first control signal terminal S1, the second transistor Q2, and the fourth resistor R4; and also when the third module 13, for example, includes the signal output terminal OUT1, the second control signal terminal S2, the single-pole double-throw switch Q9, the second signal input terminal V2, the third signal input terminal V3, the fourth transistor Q4, the eighth transistor R8 and the signal terminal V5, the drive method provided in the present disclosure may still include at least the first drive stage and the second drive stage. In the first drive stage, the first step may be to transmit the second level signal, for example, the low-level signal, to the first control signal terminal S1, and to transmit the first level signal, for example, the high-level signal, to the second control signal terminal S2. The single-pole double-throw switch Q9 may be electrically connected to the third signal input terminal V3 and the signal terminal V5 to receive a same electrical signal. At this point, the single-pole double-throw switch Q9 may receive the low-level signal inputted from the third signal input terminal V3 (the signal terminal V5) and transmit the low-level signal to the control electrode of the fourth transistor Q4, such that the fourth transistor Q4 may be in the disconnection state. The low-level signal of the first control signal terminal S1 may be transmitted to the second transistor Q2, such that the second transistor Q2 and the first transistor Q1 may both be in the disconnection state. The second step may be to adjust the first control signal terminal S1 to receive the high-level signal. The second control signal terminal S2 may still receive the high-level signal. At this point, the control electrode of the second transistor Q2 may receive the high-level signal, thereby driving both the second transistor Q2 and the first transistor Q1 to be in the conduction state. At this point, the fourth transistor Q4 may be still in the disconnection state, and the signal output terminal OUT1 may transmit the signal inputted by the first signal input terminal V1, that is, the first signal of the first signal input terminal V1 may be outputted to the connector 60.

In the second drive stage, the first step may be to transmit the second level signal, for example, the low-level signal, to the first control signal terminal S1, and to transmit the first level signal, for example, the high-level signal, to the second control signal terminal S2. At this point, the single-pole double-throw switch Q9 may receive the low-level signal inputted from the third signal input terminal V3 (the signal terminal V5) and transmit the low-level signal to the control electrode of the fourth transistor Q4, such that the fourth transistor Q4 may be in the disconnection state. The low-level signal of the first control signal terminal S1 may be transmitted to the second transistor Q2, such that the second transistor Q2 and the first transistor Q1 may both be in the disconnection state. The second step may be that the first control signal terminal S1 may still receive the low-level signal, and the second control signal terminal S2 may be adjusted to also receive the low-level signal. At this point, the control electrode of the second transistor Q2 may receive the low-level signal, such that the second transistor Q2 and the first transistor Q1 may both be in the disconnection state; and the high-level signal of the second signal input terminal V2 may be transmitted to the fourth transistor Q4 to drive the fourth transistor Q4 to be in the conduction state. At this point, the signal output terminal OUT1 may transmit the signal inputted from the signal terminal V5 (the third signal input terminal V3), and the signal output terminal OUT1 may output the second signal of the signal terminal V5 (the third signal input terminal V3) to the connector 60.

In the first drive stage, the switch unit 10 may output the first signal of the first signal input terminal V1 to the connector 60. The present disclosure provides that the ground voltage to the first signal input terminal V1 in the Gate switch unit may not be lower than 40V. Therefore, the voltage magnitude of the first signal transmitted to the connector 60 may be sufficiently large. When the first signal is finally transmitted to the corresponding drive electrode, the drive voltage received by the drive electrode may be sufficient to drive and move the liquid droplets 74.

It can be known from above-mentioned embodiments that the microfluidic apparatus and its drive circuit and drive method provided by the present disclosure may achieve at least the following beneficial effects.

The present disclosure provides the microfluidic apparatus and its drive circuit and drive method. The magnitude of the electrical signal finally outputted to the drive electrode may be controlled by building the new drive circuit in the provided microfluidic apparatus, controlling the magnitude of the electrical signal received by the signal input terminal, and controlling the type of the signal finally outputted by the drive circuit, thereby realizing the output of the high-level signal with a higher value, and driving of the liquid droplets in the microfluidic apparatus.

Although some embodiments of the present disclosure have been described in detail through examples, those skilled in the art should understand that the above-mentioned embodiments are only for illustration and not for limiting the scope of the present disclosure. Those skilled in the art should understand that the above-mentioned embodiments may be modified without departing from the scope and spirit of the present disclosure. The scope of the present disclosure may be defined by the appended claims.

What is claimed is:

1. A drive circuit of a microfluidic apparatus, comprising:

at least one switch unit, wherein a switch unit of the at least one switch unit includes a first signal input terminal, a signal output terminal, a first control signal terminal, a second control signal terminal, a signal terminal, a first module, a second module, and a third module, wherein:

the first module is electrically connected to the first signal input terminal, the signal output terminal, and the second module; the second module is at least electrically connected to the first control signal terminal; and the third module is at least electrically connected to the signal output terminal, the second control signal terminal, and the signal terminal;

the first control signal terminal is configured to control the first module and the second module to be in conduction or disconnection, and the second control signal terminal is configured to control the third module to be in conduction or disconnection, thereby controlling the signal output terminal to output a first signal of the first signal input terminal or a second signal of the signal terminal; and the third module includes a third transistor, a fifth transistor, a fifth resistor, a sixth resistor, a seventh resistor, and a fourth signal input terminal, wherein:

a first terminal of the fifth resistor is electrically connected to the second control signal terminal and a control electrode of the fifth transistor; and a second terminal, which is grounded, of the fifth resistor is electrically connected to a first electrode of the fifth transistor;

a first terminal of the sixth resistor is electrically connected to the fourth signal input terminal, and a second terminal of the sixth resistor is electrically connected to a second electrode of the fifth transistor and a control electrode of the third transistor;

a first terminal of the seventh resistor is electrically connected to a first electrode of the third transistor, and a second terminal of the seventh resistor is electrically connected to the signal output terminal; and a second electrode of the third transistor is electrically connected to the signal terminal, which is grounded.

2. The drive circuit according to claim 1, wherein:

a voltage signal received by the fourth signal input terminal is V4, wherein $10V \leq V4 \leq 14V$.

3. The drive circuit according to claim 1, wherein:

the first control signal terminal is electrically connected to the second control signal terminal.

4. The drive circuit according to claim 1, wherein:

a voltage signal received by the first signal input terminal is V1; and the at least one switch unit includes a first switch unit and a second switch unit; and in the first switch unit, $V1 \geq 40V$; and in the second switch unit, $V1 \geq 50V$.

5. The drive circuit according to claim 1, wherein:

the first module includes a first transistor, a first resistor, and a second resistor, wherein:

a first terminal of the first resistor is electrically connected to the first signal input terminal and a first electrode of the first transistor; and a second terminal of the first resistor is electrically connected to a first terminal of the second resistor and a control electrode of the first transistor;

a second terminal of the second resistor is electrically connected to the second module; and a second electrode of the first transistor is electrically connected to the signal output terminal.

6. The drive circuit according to claim 5, wherein:

the first module further includes a third resistor, wherein a first terminal of the third resistor is electrically connected to the first signal input terminal, and a second terminal of the third resistor is electrically connected to the first terminal of the second resistor.

7. The drive circuit according to claim 1, wherein:

the second module includes a second transistor, wherein a first electrode of the second transistor is electrically connected to the first module, a control electrode of the second transistor is electrically connected to the first control signal terminal, and a second electrode of the second transistor is electrically grounded.

8. The drive circuit according to claim 7, wherein:

the second module further includes a fourth resistor, wherein a first terminal of the fourth resistor is electrically connected to the first control signal terminal, and a second terminal of the fourth resistor is electrically connected to the second electrode of the second transistor.

9. The drive circuit according to claim 1, further including:

an integrated chip, electrically connected to the first control signal terminal and the second control signal terminal of any one of the at least one switch unit.

10. The drive circuit according to claim 9, further including:

a first step-up unit, a first step-down unit, a first voltage stabilizer, a second voltage stabilizer, a total voltage signal terminal, and a connector, wherein the at least one switch unit includes a first switch unit, wherein:

a first terminal of the first step-up unit is electrically connected to the total voltage signal terminal, and a second terminal of the first step-up unit is electrically connected to a first signal input terminal of the first switch unit;

a first terminal of the first step-down unit is electrically connected to the total voltage signal terminal, and a second terminal of the first step-down unit is electrically connected to a first terminal of the first voltage stabilizer and a first terminal of the second voltage stabilizer;

a second terminal of the first voltage stabilizer and a second terminal of the second voltage stabilizer are both electrically connected to the integrated chip; and a signal output terminal of the first switch unit is electrically connected to the connector.

11. The drive circuit according to claim 10, wherein:

the first switch unit further includes a fourth signal input terminal, electrically connected to the total voltage signal terminal.

12. The drive circuit according to claim 9, further including:

a first step-up unit, a first step-down unit, a second step-down unit, a third step-down unit, a fourth step-down unit, a first voltage stabilizer, a second voltage stabilizer, a total voltage signal terminal, and a connector, wherein the at least one switch unit includes a second switch unit, wherein:

a first terminal of the first step-up unit is electrically connected to the total voltage signal terminal, and a second terminal of the first step-up unit is electrically connected to a first signal input terminal of the second switch unit;

a first terminal of the first step-down unit is electrically connected to the total voltage signal terminal, and a second terminal of the first step-down unit is electrically connected to a first terminal of the first voltage stabilizer and a first terminal of the second voltage stabilizer;

a first terminal of the second step-down unit is electrically connected to the total voltage signal terminal, and a second terminal of the second step-down unit is electrically connected to a signal terminal of the second switch unit;

a first terminal of the third step-down unit is electrically connected to the total voltage signal terminal, and a second terminal of the third step-down unit is electrically connected to a second signal input terminal of the second switch unit;

a first terminal of the fourth step-down unit is electrically connected to the total voltage signal terminal, and a second terminal of the fourth step-down unit is electrically connected to a third signal input terminal of the second switch unit;

a second terminal of the first voltage stabilizer and a second terminal of the second voltage stabilizer are both electrically connected to the integrated chip; and a signal output terminal of the second switch unit is electrically connected to the connector.

13. The drive circuit according to claim 12, wherein:

the second step-down unit is reused as the fourth step-down unit.

14. The drive circuit according to claim 9, further including:

a first step-up unit, a second step-up unit, a first step-down unit, a second step-down unit, a third step-down unit, a fourth step-down unit, a first voltage stabilizer, a second voltage stabilizer, a total voltage signal terminal, and a connector, wherein the at least one switch unit includes a first switch unit and a second switch unit, wherein:

a first terminal of the first step-up unit is electrically connected to the total voltage signal terminal, and a second terminal of the first step-up unit is electrically connected to a first signal input terminal of the first switch unit;

a first terminal of the second step-up unit is electrically connected to the total voltage signal terminal, and a second terminal of the second step-up unit is electrically connected to a first signal input terminal of the second switch unit;

a first terminal of the first step-down unit is electrically connected to the total voltage signal terminal, and a second terminal of the first step-down unit is electrically connected to a first terminal of the first voltage stabilizer and a first terminal of the second voltage stabilizer;

a first terminal of the second step-down unit is electrically connected to the total voltage signal terminal, and a second terminal of the second step-down unit is electrically connected to a signal terminal of the second switch unit;

a first terminal of the third step-down unit is electrically connected to the total voltage signal terminal, and a second terminal of the third step-down unit is electrically connected to a second signal input terminal of the second switch unit;

a first terminal of the fourth step-down unit is electrically connected to the total voltage signal terminal, and a second terminal of the fourth step-down unit is electrically connected to a third signal input terminal of the second switch unit;

a second terminal of the first voltage stabilizer and a second terminal of the second voltage stabilizer are both electrically connected to the integrated chip; and signal output terminals of the first switch unit and the second switch unit are both electrically connected to the connector.

15. The drive circuit according to claim 14, wherein:

the first switch unit further includes a fourth signal input terminal, electrically connected to the total voltage signal terminal.

16. The drive circuit according to claim 14, wherein:

the second step-down unit is reused as the fourth step-down unit.

17. A microfluidic apparatus, comprising:

a first substrate and a second substrate which are disposed oppositely;

a drive electrode layer which is on the first substrate and includes a plurality of drive electrodes;

a first insulating layer on a side of the drive electrode layer facing the second substrate;

a second insulating layer which is on the second substrate and adjacent to a side of the first insulating layer; and a passage, formed between the first insulating layer and the second insulating layer and used to accommodate liquid droplets, wherein:

a drive electrode of the plurality of drive electrodes is electrically connected to a drive circuit, wherein the drive circuit includes:

at least one switch unit, wherein a switch unit of the at least one switch unit includes a first signal input terminal, a signal output terminal, a first control signal terminal, a second control signal terminal, a signal terminal, a first module, a second module, and a third module, wherein:

the first module is electrically connected to the first signal input terminal, the signal output terminal, and the second module; the second module is at least electrically connected to the first control signal terminal; and the third module is at least electrically connected to the signal output terminal, the second control signal terminal, and the signal terminal;

the first control signal terminal is configured to control the first module and the second module to be in conduction or disconnection, and the second control signal terminal is configured to control the third module to be in conduction or disconnection, thereby controlling the signal output terminal to output a first signal of the first signal input terminal or a second signal of the signal terminal; and the third module includes a third transistor, a fifth transistor, a fifth resistor, a sixth resistor, a seventh resistor, and a fourth signal input terminal, wherein:

a first terminal of the fifth resistor is electrically connected to the second control signal terminal and a control electrode of the fifth transistor; and a second terminal, which is grounded, of the fifth resistor is electrically connected to a first electrode of the fifth transistor;

a first terminal of the sixth resistor is electrically connected to the fourth signal input terminal, and a second terminal of the sixth resistor is electrically connected to a second electrode of the fifth transistor and a control electrode of the third transistor;

a first terminal of the seventh resistor is electrically connected to a first electrode of the third transistor, and a second terminal of the seventh resistor is electrically connected to the signal output terminal; and a second electrode of the third transistor is electrically connected to the signal terminal, which is grounded.

18. The microfluidic apparatus according to claim 17, wherein:

the drive circuit includes a connector and a flexible printed circuit; and the connector is electrically connected to a first port of the flexible printed circuit; and the drive electrode is electrically connected to a second port of the flexible printed circuit.

* * * * *